(12) United States Patent
Ginn et al.

(10) Patent No.: US 8,831,577 B2
(45) Date of Patent: *Sep. 9, 2014

(54) VENUE-ORIENTED COMMERCE VIA MOBILE COMMUNICATION DEVICE

(75) Inventors: Justin Ginn, Durango, CO (US); Ryan Danford, Durango, CO (US); Chip Lile, Durango, CO (US); Cordell Brown, Durango, CO (US)

(73) Assignee: Airborne Media Group, Inc., Durango, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/485,779

(22) Filed: May 31, 2012

(65) Prior Publication Data
US 2012/0309366 A1 Dec. 6, 2012

Related U.S. Application Data

(60) Provisional application No. 61/493,194, filed on Jun. 3, 2011.

(51) Int. Cl.
*H04L 29/06* (2006.01)
*H04N 21/41* (2011.01)
(Continued)

(52) U.S. Cl.
CPC ..... *H04N 21/42202* (2013.01); *H04N 21/4126* (2013.01); *H04W 4/021* (2013.01); *H04N 21/43637* (2013.01); *H04N 21/25866* (2013.01); *H04N 21/482* (2013.01); *H04N 21/4622* (2013.01); *H04N 21/812* (2013.01); *H04N 21/41415* (2013.01); *H04N 21/8106* (2013.01); *H04N 21/25841* (2013.01); *H04N 21/4788* (2013.01)
USPC ............ 455/414.3; 455/404.2; 455/411; 455/414.1; 455/435.1; 370/328; 370/338; 705/14.4; 705/14.57; 705/14.73; 725/59; 725/61; 725/62

(58) Field of Classification Search
USPC ......... 725/35, 36, 61, 62, 74; 455/404.2, 407, 455/411, 414.1, 432.1, 435.1, 435; 370/328–338; 705/14.4, 14.57, 14.73
See application file for complete search history.

(56) References Cited

U.S. PATENT DOCUMENTS

| 5,510,828 A | 4/1996 | Lutterbach et al. |
| 5,708,961 A | 1/1998 | Hylton et al. |

(Continued)

FOREIGN PATENT DOCUMENTS

| EP | 1643759 A1 | 4/2006 |
| GB | 2446893 | 8/2008 |

(Continued)

OTHER PUBLICATIONS

"U.S. Appl. No. 13/485,806, Non Final Office Action mailed Sep. 12, 2012", 15 pgs.

(Continued)

*Primary Examiner* — Quan M Hua
(74) *Attorney, Agent, or Firm* — Schwegman Lundberg & Woessner, P.A.

(57) ABSTRACT

Methods and systems for venue-oriented commerce via a mobile communication device are presented. An example system may include an access device and a communication node. The access device may be located at a commercial venue and communicatively coupled via a local area network with a mobile communication device located at the venue. The communication node may be communicatively coupled to the access device via a wide area network to provide a commercial service related to the commercial venue to a user of the mobile communication device. The access device may exchange information relating to the commercial service between the communication node and the mobile communication device.

23 Claims, 15 Drawing Sheets

(51) Int. Cl.
*H04N 21/4363* (2011.01)
*H04N 21/258* (2011.01)
*H04N 21/482* (2011.01)
*H04N 21/462* (2011.01)
*H04N 21/81* (2011.01)
*H04N 21/422* (2011.01)
*H04N 21/414* (2011.01)
*H04N 21/4788* (2011.01)
*H04W 4/02* (2009.01)

(56) References Cited

U.S. PATENT DOCUMENTS

| | | |
|---|---|---|
| 5,867,223 A | 2/1999 | Schindler et al. |
| 6,064,860 A | 5/2000 | Ogden |
| 6,185,737 B1 | 2/2001 | Northcutt et al. |
| 6,263,503 B1 | 7/2001 | Margulis |
| 6,300,880 B1 | 10/2001 | Sitnik |
| 6,871,356 B2 | 3/2005 | Chang |
| 7,567,846 B2 | 7/2009 | Sztybel |
| 7,593,687 B2 | 9/2009 | Anderson, Jr. et al. |
| 7,636,930 B2 | 12/2009 | Chang |
| 7,826,877 B2 | 11/2010 | Ortiz et al. |
| 7,840,984 B1 | 11/2010 | Owens et al. |
| 7,945,934 B2 | 5/2011 | Margis et al. |
| 8,082,353 B2 | 12/2011 | Huber et al. |
| 8,086,184 B2 | 12/2011 | Ortiz |
| 8,171,131 B2 | 5/2012 | Mobasser |
| 8,214,738 B2 | 7/2012 | Othmer et al. |
| 8,437,320 B2 | 5/2013 | Tamura |
| 8,495,236 B1 | 7/2013 | Glasser |
| 2002/0103030 A1 | 8/2002 | Muramatsu |
| 2002/0115454 A1 | 8/2002 | Hardacker |
| 2003/0037110 A1 | 2/2003 | Yamamoto |
| 2003/0208554 A1 | 11/2003 | Holder |
| 2004/0063458 A1 | 4/2004 | Hori |
| 2004/0080213 A1 | 4/2004 | Chang |
| 2004/0083491 A1 | 4/2004 | Chang |
| 2004/0106379 A1 | 6/2004 | Zen et al. |
| 2004/0181602 A1* | 9/2004 | Fink .............................. 709/229 |
| 2004/0186780 A1* | 9/2004 | Short et al. ...................... 705/14 |
| 2004/0220862 A1 | 11/2004 | Jackson |
| 2005/0066369 A1 | 3/2005 | Chang |
| 2005/0245271 A1 | 11/2005 | Vesuna |
| 2005/0262146 A1 | 11/2005 | Grace et al. |
| 2006/0218595 A1 | 9/2006 | Chang |
| 2007/0018952 A1 | 1/2007 | Arseneau |
| 2007/0033197 A1 | 2/2007 | Scherzer et al. |
| 2007/0058041 A1 | 3/2007 | Arseneau et al. |
| 2007/0060054 A1 | 3/2007 | Romesburg |
| 2007/0121534 A1 | 5/2007 | James et al. |
| 2007/0127650 A1* | 6/2007 | Altberg et al. ........... 379/114.13 |
| 2007/0136770 A1 | 6/2007 | Kim |
| 2007/0179792 A1 | 8/2007 | Kramer |
| 2007/0188611 A1 | 8/2007 | Carter |
| 2008/0021958 A1 | 1/2008 | Foote |
| 2008/0091415 A1 | 4/2008 | Schafer |
| 2008/0140650 A1 | 6/2008 | Stackpole |
| 2008/0210753 A1 | 9/2008 | Plozay et al. |
| 2008/0255759 A1 | 10/2008 | Abhyanker |
| 2008/0288600 A1 | 11/2008 | Clark |
| 2008/0320085 A1 | 12/2008 | Bouilloux-Lafont et al. |
| 2009/0017749 A1* | 1/2009 | Braun .......................... 455/3.01 |
| 2009/0022120 A1 | 1/2009 | Buer et al. |
| 2009/0064246 A1 | 3/2009 | Bell |
| 2009/0083805 A1 | 3/2009 | Sizelove et al. |
| 2009/0089417 A1 | 4/2009 | Giffin et al. |
| 2009/0221230 A1* | 9/2009 | Ortiz et al. ................... 455/3.06 |
| 2009/0305680 A1 | 12/2009 | Swift et al. |
| 2010/0007458 A1 | 1/2010 | Cannistraro et al. |
| 2010/0020752 A1 | 1/2010 | Anschutz et al. |
| 2010/0046485 A1 | 2/2010 | Merlin et al. |
| 2010/0114783 A1 | 5/2010 | Spolar |
| 2010/0131385 A1 | 5/2010 | Harrang et al. |
| 2010/0146563 A1 | 6/2010 | Chang |
| 2010/0180297 A1 | 7/2010 | Levine et al. |
| 2010/0186051 A1 | 7/2010 | VonDoenhoff et al. |
| 2010/0199340 A1 | 8/2010 | Jonas |
| 2010/0234100 A1 | 9/2010 | Gagner et al. |
| 2010/0254297 A1 | 10/2010 | Mckenna et al. |
| 2010/0257234 A1 | 10/2010 | Caughey |
| 2011/0013775 A1 | 1/2011 | Hu et al. |
| 2011/0028160 A1 | 2/2011 | Roeding et al. |
| 2011/0034181 A1 | 2/2011 | Jagetiya et al. |
| 2011/0060994 A1 | 3/2011 | Maxwell et al. |
| 2011/0061108 A1 | 3/2011 | Arrasvuori et al. |
| 2011/0075612 A1 | 3/2011 | Guo |
| 2011/0106896 A1 | 5/2011 | Baransky et al. |
| 2011/0107382 A1 | 5/2011 | Morris et al. |
| 2011/0125566 A1 | 5/2011 | Mclaughlin et al. |
| 2011/0126132 A1 | 5/2011 | Anderson et al. |
| 2011/0137975 A1 | 6/2011 | Das et al. |
| 2011/0145258 A1 | 6/2011 | Kankainen |
| 2011/0161085 A1 | 6/2011 | Boda et al. |
| 2011/0190066 A1 | 8/2011 | Barclay et al. |
| 2011/0191364 A1 | 8/2011 | LeBeau et al. |
| 2011/0214086 A1 | 9/2011 | Narayanan et al. |
| 2011/0252071 A1 | 10/2011 | Cidon |
| 2011/0270926 A1 | 11/2011 | Boyd et al. |
| 2011/0282893 A1 | 11/2011 | Dolin et al. |
| 2011/0296484 A1 | 12/2011 | Harres et al. |
| 2011/0302024 A1 | 12/2011 | Gunawardana et al. |
| 2011/0314098 A1 | 12/2011 | Farrell et al. |
| 2012/0013695 A1 | 1/2012 | Vartanian et al. |
| 2012/0039309 A1 | 2/2012 | Evans et al. |
| 2012/0042337 A1 | 2/2012 | De Bonet et al. |
| 2012/0079429 A1 | 3/2012 | Stathacopoulos et al. |
| 2012/0089581 A1 | 4/2012 | Gupta et al. |
| 2012/0095749 A1 | 4/2012 | Capretta |
| 2012/0127974 A1 | 5/2012 | Doppler et al. |
| 2012/0130796 A1 | 5/2012 | Busch |
| 2012/0130886 A1 | 5/2012 | Shergill et al. |
| 2012/0158751 A1 | 6/2012 | Tseng |
| 2012/0166351 A1 | 6/2012 | Belvin et al. |
| 2012/0173566 A1 | 7/2012 | D'Angelo et al. |
| 2012/0173753 A1 | 7/2012 | Moorthy |
| 2012/0190437 A1 | 7/2012 | Agarwal et al. |
| 2012/0200774 A1* | 8/2012 | Ehlers, Sr. ................... 348/515 |
| 2012/0203648 A1 | 8/2012 | Rothschild |
| 2012/0209685 A1 | 8/2012 | Nealer et al. |
| 2012/0226743 A1 | 9/2012 | Smargon |
| 2012/0253935 A1 | 10/2012 | Blom |
| 2012/0254774 A1 | 10/2012 | Patton |
| 2012/0260295 A1 | 10/2012 | Rondeau |
| 2012/0268553 A1 | 10/2012 | Talukder |
| 2012/0271831 A1 | 10/2012 | Narayanan et al. |
| 2012/0281965 A1 | 11/2012 | Hunt et al. |
| 2012/0308032 A1 | 12/2012 | Ginn et al. |
| 2012/0308033 A1 | 12/2012 | Ginn |
| 2012/0308035 A1 | 12/2012 | Ginn et al. |
| 2012/0311642 A1 | 12/2012 | Ginn et al. |
| 2012/0323743 A1 | 12/2012 | Chang et al. |
| 2013/0031475 A1 | 1/2013 | Maor et al. |
| 2013/0117086 A1 | 5/2013 | Mesaros |
| 2013/0143649 A1 | 6/2013 | Allen |
| 2013/0150150 A1 | 6/2013 | Allen et al. |
| 2013/0310183 A1 | 11/2013 | Gagner et al. |
| 2014/0023091 A1 | 1/2014 | Ginn et al. |

FOREIGN PATENT DOCUMENTS

| | | |
|---|---|---|
| GB | 2460219 A | 11/2009 |
| WO | WO-0147248 A2 | 6/2001 |
| WO | WO-0163430 A1 | 8/2001 |
| WO | WO 2007009225 * | 1/2007 |
| WO | WO-2007009225 A1 | 1/2007 |
| WO | WO-2007040666 A1 | 4/2007 |
| WO | WO-2009011935 A1 | 1/2009 |
| WO | WO-2012/051288 A2 | 4/2012 |
| WO | WO-2012167157 A1 | 12/2012 |
| WO | WO-2012167165 A2 | 12/2012 |

(56) References Cited

FOREIGN PATENT DOCUMENTS

| WO | WO-2012167166 A1 | 12/2012 |
|---|---|---|
| WO | WO-2012167182 A1 | 12/2012 |

OTHER PUBLICATIONS

"International Application Serial No. PCT/US2012/040559, International Search Report mailed Sep. 4, 2012", 3 pgs.

"International Application Serial No. PCT/US2012/040559, Written Opinion mailed Sep. 4, 2012", 4 pgs.

"International Application Serial No. PCT/US2012/040569, Search Report mailed Sep. 7, 2012",2 pgs.

"International Application Serial No. PCT/US2012/040569, Written Opinion mailed Sep. 7, 2012", 5 pgs.

"International Application Serial No. PCT/US2012/040586, International Search Report mailed Aug. 27, 2012", 3 pgs.

"International Application Serial No. PCT/US2012/040586, Written Opinion mailed Aug. 27, 2012", 4 pgs.

"U.S. Appl. No. 13/485,764, Non Final Office Action mailed Nov. 21, 2012", 16 pgs.

"U.S. Appl. No. 13/485,806, Response filed Dec. 12, 2012 to Non Final Office Action mailed Sep. 12, 2012", 14 pgs.

"U.S. Appl. No. 13/485,819, Non Final Office Action mailed Nov. 23, 2012", 24 pgs.

"U.S. Appl. No. 13/485,764, Final Office Action mailed May 2, 2013", 17 pgs.

"U.S. Appl. No. 13/485,764, Response filed Feb. 21, 2013 to Non-Final Office Action mailed Nov. 21, 2012", 13 pgs.

"U.S. Appl. No. 13/485,800, Non Final Office Action mailed Mar. 1, 2013", 21 pgs.

"U.S. Appl. No. 13/485,806, Final Office Action mailed Feb. 28, 2013", 21 pgs.

"U.S. Appl. No. 13/485,819 , Response filed Feb. 25, 2013 to Non Final Office Action mailed Nov. 23, 2012", 15 pgs.

"U.S. Appl. No. 13/485,819, Final Office Action mailed Apr. 26, 2013", 34 pgs.

"U.S. Appl. No. 13/485,300 , Response filed Jun. 3, 2013 to Non Final Office Action mailed Mar. 1, 2013", 14 pgs.

"U.S. Appl. No. 13/485,800, Non Final Office Action mailed Jul. 15, 2013", 21 pgs.

Ehlers, Sr., G. A., "Front Row Wireless™, With Latency Delay Compensator", U.S. Appl. No. 61/440,006, filed Feb. 7, 2011, 39 pgs.

Oganesyan, A., "System and Method for Providing Audio Content Associated With Broadcasted Multimedia and Live Entertainment Events Based on Profiling Information", U.S. Appl. No. 61/392,306, filed Oct. 12, 2010, 49 pgs.

"International Application Serial No. PCT/US2012/040559, International Preliminary Report on Patentability dated Dec. 4, 2013", 5 pgs.

"International Application Serial No. PCT/US2012/040569, International Preliminary Report on Patentability dated Dec. 4, 2013", 6 pgs.

"International Application Serial No. PCT/US2012/040586, International Preliminary Report on Patentability dated Dec. 4, 2013", 6 pgs.

Huang, Chung-Ming, et al., "REDUP: a packet loss recovery scheme for real-time audio streaming over wireless IP networks", *The Journal of Systems and Software*, 79, (2006), 29-42.

"U.S. Appl. No. 113/485,764, Response filed Nov. 4, 2013 to Final Office Action mailed May 2, 2013", 13 pgs.

"U.S. Appl. No. 13/485,764, Non Final Office Action mailed Nov. 14, 2013", 22 pgs.

"U.S. Appl. No. 13/485,800, Response filed Nov. 15, 2013 to Non Final Office Action mailed Jul. 15, 2013", 13 pgs.

"U.S. Appl. No. 13/485,806, Response filed Aug. 28, 2013 to Final Office Action mailed Feb. 28, 2013", 16 pgs.

"U.S. Appl. No. 13/485,764, Response filed May 14, 2014 to Non Final Office Action mailed Nov. 14, 2013", 13 pgs.

"U.S. Appl. No. 13/485,800, Final Office Action mailed Mar. 21, 2014", 26 pgs.

"international Application Serial No. PCT/US2012/040559, International Preliminary Report on Patentability mailed Dec. 19, 2013", 6 pgs.

"International Application Serial No. PCT/US2012/040569, International Preliminary Report on Patentability mailed Dec. 19, 2013", 7 pgs.

U.S. Appl. No. 13/947,401, filed Jul. 22, 2013, Redundant, Low-Latency Digital Audio Transmission.

U.S. Appl. No. 13/485,764, Final Office Action mailed Jul. 18, 2014, 24 pgs.

* cited by examiner

US 8,831,577 B2

VENUE-ORIENTED COMMERCE VIA MOBILE COMMUNICATION DEVICE

RELATED APPLICATIONS

This application claims the benefit of U.S. Provisional Application No. 61/493,194, titled "SYSTEMS AND METHOD FOR PROVIDING MULTIPLE AUDIO STREAMS IN A VENUE," filed Jun. 3, 2011, and which is hereby incorporated herein by reference in its entirety.

TECHNICAL FIELD

This application relates generally to venue-oriented communications and, more specifically, to systems and methods for providing one or more venue-oriented services, such as, for example, the distribution of multiple audio streams.

BACKGROUND

On both satellite and cable television distribution systems, numerous sports programs and events, as well as other audio/video content of interest, may be transmitted and presented simultaneously over different broadcast channels. Given the varying interest of potential patrons, some public establishments, such as bars, sports books, and the like, may provide multiple televisions, video monitors, projection systems, and similar audio/video devices to provide many different such programs concurrently for the enjoyment of their clientele. Ordinarily, these devices are placed in relatively close proximity to each other, or are placed in the same large room, so any patron of the establishment may view any of multiple video devices without changing locations within the establishment.

However, given such an arrangement of the audio/video devices within the establishment, allowing each of the audio/video devices, or some related devices, to produce the audio for each program being displayed is impractical due to the confusing, and likely unintelligible, sounds that would result. To prevent such confusion, in some situations the audio associated with a single one of the programs being shown may be produced, such as the sound associated with the most popular program or event being presented in the establishment at the time. Additionally, in some cases, one or more of the audio/video devices may be placed in a "closed captioning mode," in which text reflecting the words spoken by sports announcers or others associated with the program is displayed on the screen to provide at least some reflection of the program audio to the patrons viewing that program.

BRIEF DESCRIPTION OF THE DRAWINGS

Some embodiments are illustrated by way of example and not limitation in the figures of the accompanying drawings in which.

DETAILED DESCRIPTION

Example methods and systems for distribution of multiple audio signals are discussed. In the following description, for purposes of explanation, numerous specific details are set forth in order to provide a thorough understanding of example embodiments. It will be evident, however, to one skilled in the art that the present subject matter may be practiced without these specific details. It will also be evident that the venues and environments described herein in which audio signal distribution may occur are not limited to the examples provided and may include other scenarios not specifically discussed.

Figure 1:
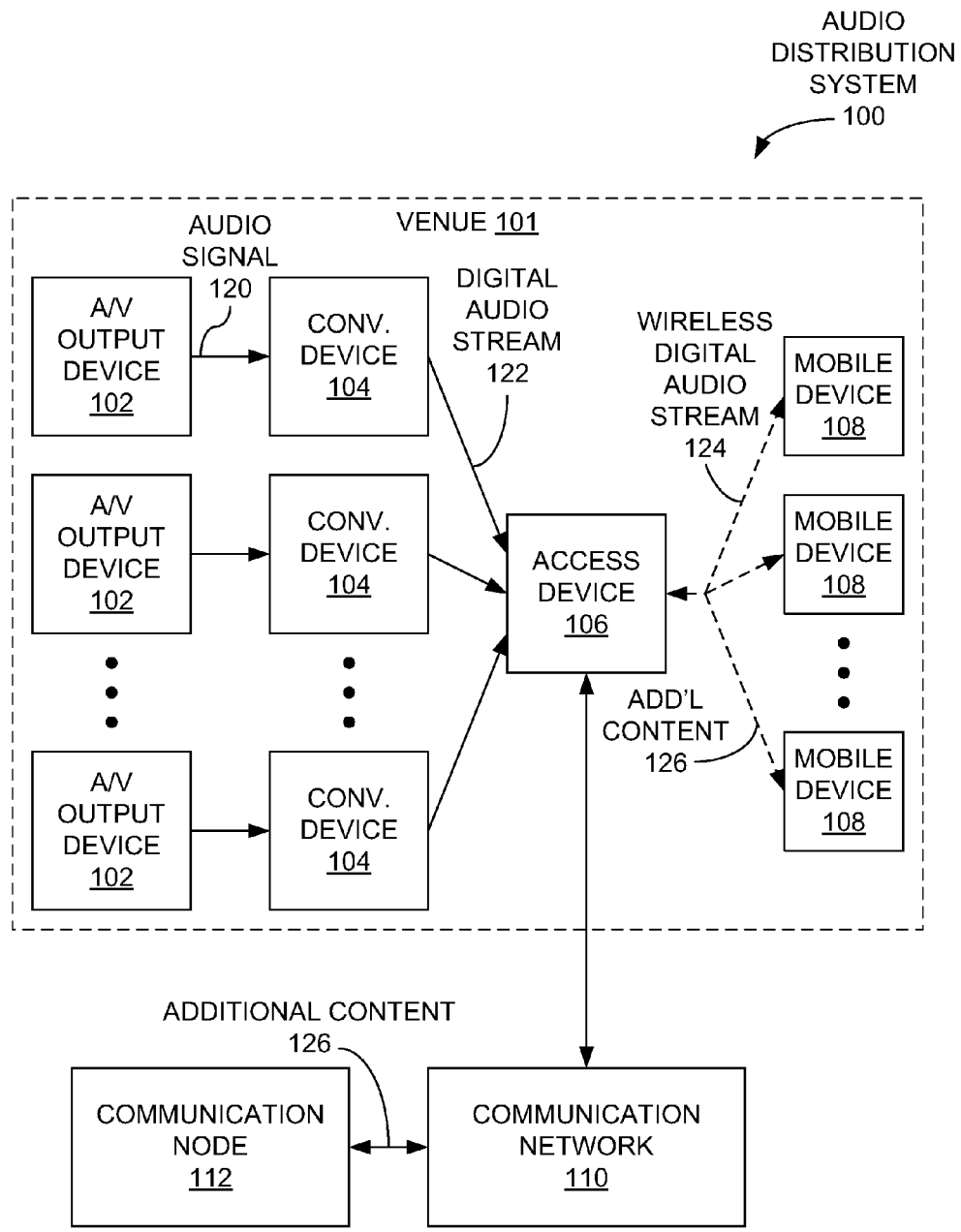
FIG. 1 is a block diagram illustrating an example audio distribution system including a plurality of converter devices and an access device.

In accordance with an example embodiment, FIG. 1 illustrates an audio distribution system 100. Generally, the audio distribution system 100 is configured to provide multiple streams of audio content to at least one mobile device 108. In an example, the audio distribution system 100 may be located at a particular venue. In some implementations, the venue 101 may be a public venue, such as a restaurant, a drinking establishment, or a race and sports "book." In such a venue, each of multiple audio/video output devices 102, such as televisions, video monitors, video projectors, and the like, may present one of a number of sporting events or other audio/video programs to customers or viewers located at the venue. To allow the patrons of the venue to receive the audio portion being received by one of the output devices 102, the audio distribution system 100 makes available the audio from the output devices 102 to one or more mobile communication devices 108 held or possessed by patrons of the establishment. Examples of the mobile communication devices 108 include, but are not limited to, cellular "smart" phones, personal digital assistants (PDAs), laptop computers, and tablet computers. In some implementations, each of the mobile communication devices 108 may be owned and operated by its respective user, or may be loaned or rented by operators of the venue 101 to the users.

In an example of the audio distribution system 100, each of the audio/video output devices 102 generating an audio signal that is desired to be distributed to users located at the venue 101 may be communicatively coupled with a converter device 104 (or, alternatively, an audio relay device 104), which may convert or otherwise transfer or relay the audio signal from its corresponding output device 102 to a digital audio stream 122. Each converter device 104 may transmit its converted digital audio stream 122 to one or more access devices 106. The access device 106 distributes the received digital audio streams as one or more wireless digital audio streams 124 to the mobile communication devices 108. In one example, one or more of the converter devices 104 may be integrated with each other, and/or with one or more of the access devices 106.

A user of each mobile communication device 108 may then select one of the digital audio streams 122 represented in the wireless digital audio stream 124 for reception and presentation at the mobile communication device 108 of the user. The user may then listen to the selected audio stream or channel, such as by way of a speaker incorporated into the mobile communication device 108, an earphone or headset connected to the mobile communication device 108, a Bluetooth®-enabled audio device communicatively coupled with the mobile communication device 108, or the like. As a result, each user possessing one of the mobile communication devices 108 may select and enjoy the audio portion of the audio/video content presented by way of one of the output devices 102.

In some examples, as is discussed in greater detail below, the audio distribution system 100 may also be employed as a communication conduit for offering one or more services associated with the venue 101, the audio/video content being presented via the output devices 102, or some other entity. These services may include, but are not limited to, chat rooms involving users of other mobile devices 108, advertising and sales associated with the venue 101 or other entities, customer loyalty programs associated with the venue 101 or another entity, social networking services involving other users of other mobile devices 108, and gaming or wagering services associated with the venue 101 or another entity. Such services may be organized and provided across the entire system 100, or according to some subdivision of the system 100, such as according to venue 101 or access device 106. In some examples, this functionality may be provided directly by the access device 106 or in conjunction with a communication node 112, such as an information server, communicatively coupled with the access device 106 by way of a communication network 110. Examples of the communication network 110 may include, but are not limited to, a wide-area network (WAN), such as an Intranet, the Internet, or some portion thereof, a local-area network (LAN), and an IEEE 802.11x (WiFi) network. Also, while the communication node 112 and the communication network 110 are shown as being located external to the venue 101, the communication node 112 and the network 110 may be located completely or partially within the venue 101 in other examples.

Figure 2:
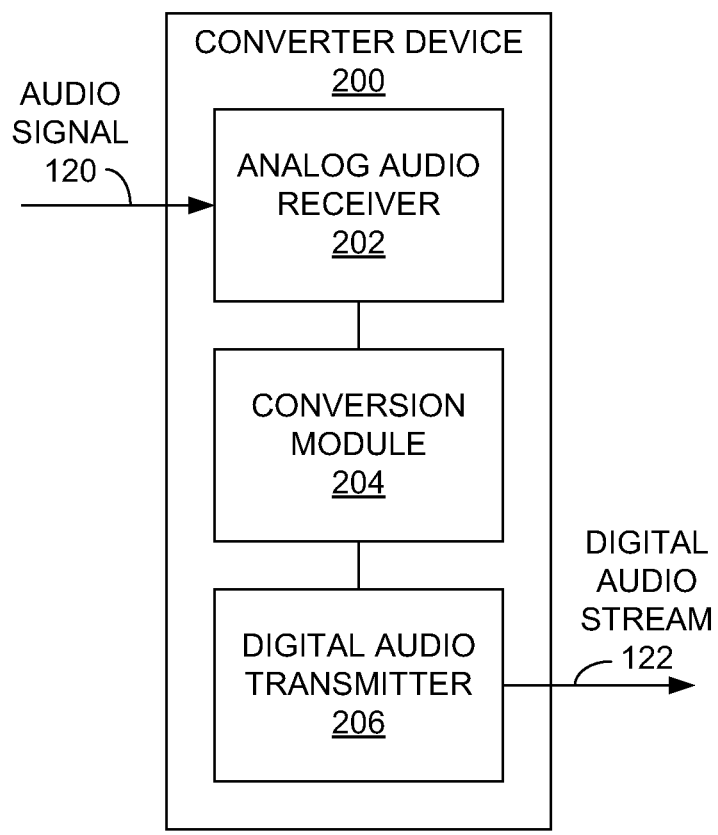
FIG. 2 is a block diagram illustrating an example converter device implementable in the audio distribution system of FIG. 1.

FIG. 2 is a block diagram of an example converter device 200 implementable as one of the converter devices 104 of FIG. 1. The converter device 200 may include an analog audio receiver 202, a conversion module 204, and a digital audio transmitter 206, although other components not explicitly depicted in FIG. 2 may also be included in the converter device 200 in other implementations.

The analog audio receiver 202 may be configured to receive an analog audio signal 102 from one of the audio/video output devices 102. In one example, the analog audio signal 102 is carried by way of a wire, cable, optical fiber, or other wired means from a standard analog "audio out" connector of the corresponding output device 102 to the converter device 200. In another implementation, the analog out connector may be attached to a wireless transmitter to carry the analog audio stream as an analog or digital wireless signal to the converter device 200. Other methods and apparatus for carrying the audio stream 120 to the converter device 200 may be employed in other embodiments. In yet further examples, the audio stream 120 generated by the audio/video output device 102 may be digital in nature, in which case the converter device 200 may or may not be required in order to present a corresponding digital audio stream 122 to the access device 106 of FIG. 1.

In some implementations, the converter device 202 may include multiple analog audio receivers 202 to receive audio content from multiple audio/video output devices 102 simultaneously. Such multiple analog audio signals may be converted and then combined into a single digital audio stream 122 or multiple digital audio streams 122 for transmission to the access device 106 of FIG. 1.

Presuming the audio stream 120 is an analog audio signal, the analog audio receiver 202 receives the audio signal 120 and provides the signal 120 to the conversion module 204. In one example, the analog audio receiver 202 includes an automatic gain control (AGC) function to adjust the gain of an amplifier of the analog audio receiver 202 to provide a somewhat consistent signal level for the input to the conversion module 204. In some instances, the analog audio receiver 202 may incorporate other functionality, such as lag reduction and network optimization logic.

The conversion module 204 may then convert the received analog audio signal to a digital audio signal. In one example, the conversion module 204 includes at least one analog-to-digital conversion (ADC) circuit that samples the analog audio stream at a sufficiently high rate to generate a digital audio stream of acceptable quality for presentation on at least one of the mobile communication devices 108. In one implementation, the conversion module 204 may also include audio compression logic or circuitry that compresses the digital audio data before transmission of the data to the access device 106. As a result, the resulting digital audio data may be in a compressed format (such as Motion Picture Experts Group-1, Audio Layer III (MP3) or Ogg) or an uncompressed format, depending on the particular embodiment.

The digital audio stream generated by the conversion module is then forwarded to the digital audio transmitter 206 for transmission to the access device 106 of FIG. 1 as the digital audio stream 122. In one example, the digital audio stream 122 is transmitted over a wire, cable, optical fiber, or the like to the access device 106. In one example, the digital audio stream is transmitted via an Ethernet connection or network to the access device 106. More specifically, the converter device 200 may be attached to an Ethernet network as a network appliance, along with other converter devices 200, for communicative coupling with the access device 106. Thus, the digital audio transmitter 206 may serve as an Ethernet transceiver that may possess a number of network configuration capabilities, including, but not limited to, dynamic and/or static Internet Protocol (IP) addressing, Transmission Control Protocol/Internet Protocol (TCP/IP) functionality, User Datagram Protocol (UDP) functionality (possibly including a checksum calculated by the user of a UDP pseudo-header), and/or the like.

In another implementation, the digital audio stream 122 is transmitted wirelessly, such as by way of a WiFi or Bluetooth® protocol. If the converter device 200 is instead incorporated within its respective access device 106, the digital audio transmitter 206 may be omitted from the converter device 200.

Figure 3:
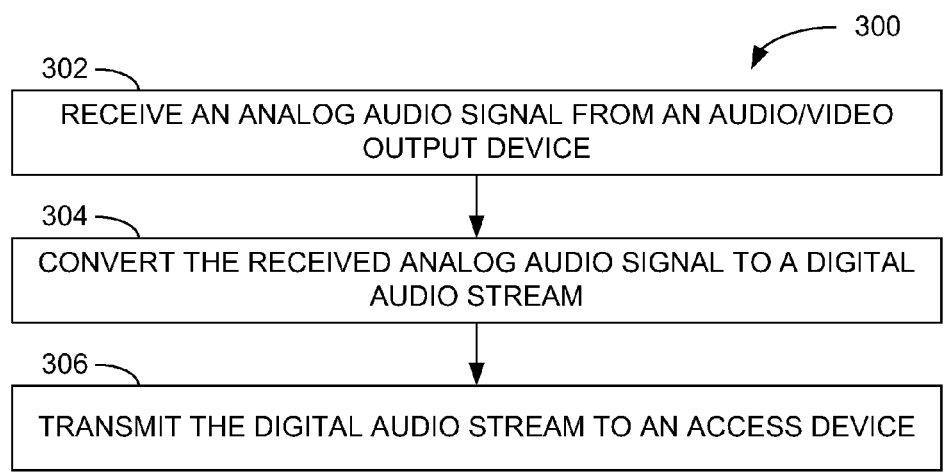
FIG. 3 is a flow diagram illustrating an example method of operating the example converter device of FIG. 2.

FIG. 3 is a flow diagram of an example method 300 of operating the converter device 200 of FIG. 2. In the method 300, the converter 200 receives an analog audio signal from an audio/video output device (operation 302). The converter device 200 coverts the received analog audio signal to a digital audio stream (operation 304). As discussed above, the conversion process may also include generating a compressed digital audio stream. The resulting digital audio stream is then transmitted to an access device (operation 306).

Figure 4:
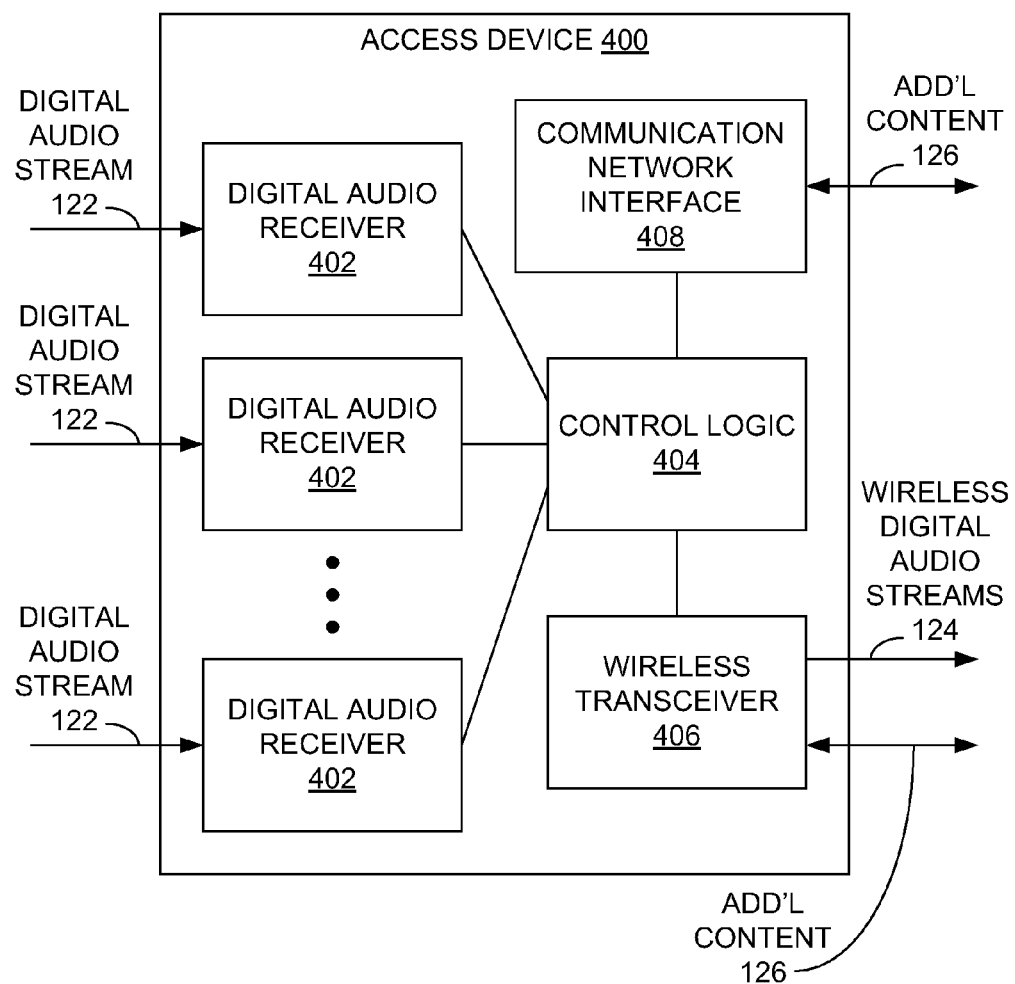
FIG. 4 is a block diagram illustrating an example access device implementable in the audio distribution system of FIG. 1.

FIG. 4 is a block diagram of an example access device 400 implementable as the access device 106 of FIG. 1. The example access device 400 may include one or more digital audio receivers 402, a wireless transceiver 406, a communication network interface 408, and control logic 404. In other examples, other components not explicitly shown in FIG. 4 may also be incorporated into the access device 400.

In the example of FIG. 4, each digital audio stream 122 generated by a converter device 104 may be received at a digital audio receiver 402 of the access device 400. In some implementations, such as the use of an Ethernet network to transmit and receive the digital audio streams 122, the digital audio receivers 402 may be embodied as a single Ethernet receiver or transceiver with multiple connectors, with each connector receiving a digital audio stream 122 from one of the converter devices 104. The Ethernet receiver may also act as a transceiver to provide the signals necessary to implement the Ethernet protocol, as controlled by the control logic 404. In other examples, a separate digital audio receiver 402 is used for each digital audio stream 122 to be received, as depicted in FIG. 4.

The control logic 404 may provide each of the received digital audio streams 122 to the wireless transceiver 406 for transmission as one or more wireless digital audio streams 124 to the mobile communication devices 108 of FIG. 1. In one example, the wireless transceiver 406, in conjunction with the control logic 404, operates as a transceiver operating under IEEE 802.11x (WiFi) protocols. In addition, the access device 400 may serve as a wireless router for transfer of additional content 126 between the various mobile communication devices 108. The access device 400 may, in some examples, operate as a router for transfer of information associated with the converter devices 200, including configuration information.

The communication network interface 408 is configured to facilitate communications between the access device 400 and the communication node 112 of FIG. 1 via the communication network 110. In one example, the communication network interface 408 employs an Ethernet connection for communication with a gateway device, such as a cable or digital subscriber line (DSL) modem in communication with the Internet or other communication network 110. In another example, the communication network interface 408 may incorporate the functionality of such a gateway device.

In some implementations, the control logic 404 may provide functionality, possibly under the guidance of a system administrator or other personnel, to support a number of functions related to the operation of the audio distribution system 100. These functions may include, but are not limited to, configuration and operation of the audio distribution functions, network management and administration of the mobile communication devices 108 as nodes of a LAN, and network routing functions for the LAN. The control logic 404 may also provide web-related functions, such as a captive portal and redirection functions similar to those associated with a "walled garden," thus giving the proprietor of the venue 101 or other entity control over web content accessible by the mobile communication devices 108 via the access device 400. Further, in one example, the control logic 404 prevents mobile communication devices 108 that are not executing a specific application that may be required to communicate with the access device 400 from discovering a network access password needed to engage in communications with the access device 400.

The control logic 404, possibly in conjunction with the communication node 112 of FIG. 1, may also facilitate one or more of the services described above, such as chatting, gaming, point-of-sale transactions, customer loyalty programs, and the like. Examples regarding these various programs are discussed in greater detail below.

The control logic 404 may include electronic hardware, software, or some combination thereof, such as one or more processors configured to execute instructions that cause the processor to perform the various operations described herein that are attributed to the access device 400.

Figure 5:
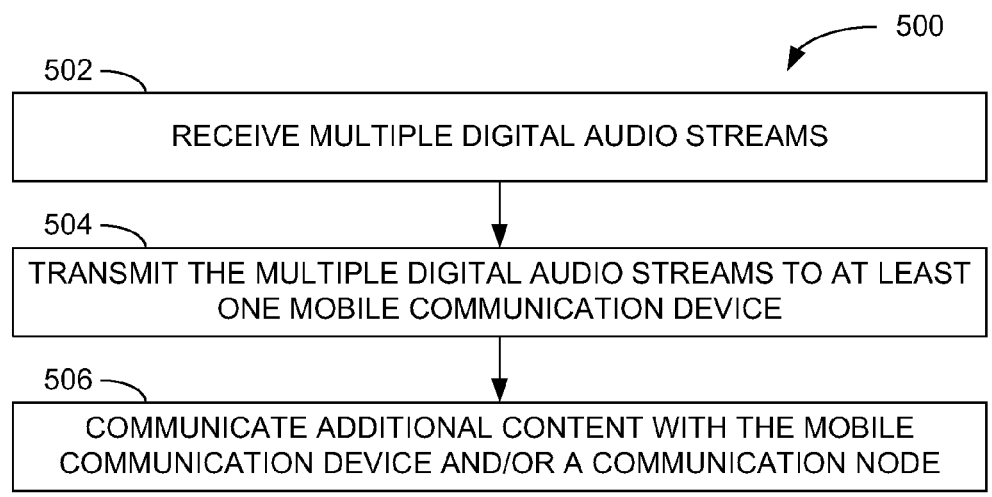
FIG. 5 is a flow diagram illustrating an example method of operating the example access device of FIG. 4.

FIG. 5 illustrates an example method 500 of operating the access device 400 of FIG. 4. In the method 500, the access device 400 receives multiple digital audio streams (operation 502), possibly from one or more converter devices, such as the converter device 200 of FIG. 2. The access device 400 transmits the multiple digital audio streams as one or more wireless digital audio streams to at least one mobile communication device (operation 504). The access device 400 may also communicate additional content with the at least one mobile communication device and/or a communication node (operation 506), as noted above.

Figure 6:
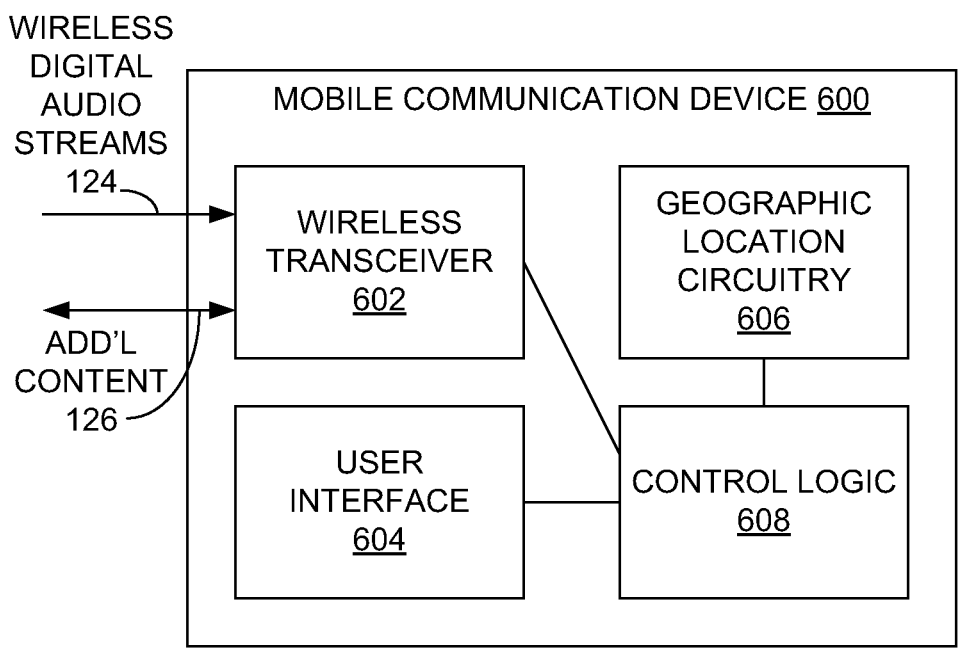
FIG. 6 is a block diagram illustrating an example mobile communication device implementable in the audio distribution system of FIG. 1.

FIG. 6 is a block diagram illustrating an example mobile communication device 600 implementable as one or more of the mobile communication devices 108 of FIG. 1. Examples of the mobile communication device 600 include, but are not limited to, "smart" phones, PDAs, laptop computers, and tablet computers. The mobile communication device 600 includes a wireless transceiver 602, a user interface 604, geographic location circuitry 606, and control logic 608. Other components not explicitly depicted in FIG. 6 may be incorporated into the mobile communication device 600 in other embodiments.

The wireless transceiver 602 receives the one or more wireless digital audio streams 124 transmitted from an access device 106, as well as transmits and/or receives the additional content 126 mentioned above. In one example, the wireless transceiver 602, under the operation of the control logic 608, communicates with the access device 106 using WiFi protocols. In some examples, the wireless transceiver 602 may also communicate with another communication network, such as a cellular telephone network employing CDMA (Code Division Multiple Access), GSM (Global System for Mobil Communications), and/or other communication protocols.

In one embodiment, the wireless transceiver 602 may receive the one or more wireless digital audio streams 124 from a source other than the access device 106. For example, a centralized audio stream server (which may not be associated with, or located near, the venue 101 at which the mobile communication device 600 is positioned) may provide at least some digital audio streams by way of the Internet or another communication network to the mobile communication device 600. Use of a centralized audio stream server may be appropriate in situations in which, for example, converter devices 104 are not available at the venue 101, or business constraints, such as licensing restrictions, exist.

The user interface 604 allows a user of the mobile communication device 600 to interact with the mobile communication device 600. Such interaction may include, for example, user selection of a wireless digital audio stream 124 received at the mobile communication device 600, user listening of the selected wireless digital audio stream 124, and user involvement with services provided via the access device 106 by way of the additional content 126 communicated between the mobile communication device 600 and the access device 106. Components that may be incorporated as part of the user interface 604 may include, but are not limited to, a visual display (possibly integrated with a touch display or touchscreen), a keypad, an audio speaker and/or audio connector, a Bluetooth® interface for an audio speaker or earphone, a microphone, a camera, and an accelerometer.

The mobile communication device 600 may also include the geographic location circuitry 606, an example of which may be circuitry for receiving satellite signals from the Global Positioning System (GPS) that may be employed by the control logic 608 to determine the geographic location of the mobile communication device 600. As is described more fully below, the control logic 608 may employ the location information to determine if a nearby access device 106 is available to the mobile device 600 for communication purposes.

The control logic 608 may control any and/or all of the other components of the mobile communications device 600, such as the wireless transceiver 602, the user interface 604, and the geographic location circuitry 606. The control logic 404 may include electronic hardware, software, or some combination thereof, such as one or more processors configured to execute instructions that cause the processor to perform the various operations described herein that are attributed to the mobile communication device 600.

Figure 7:
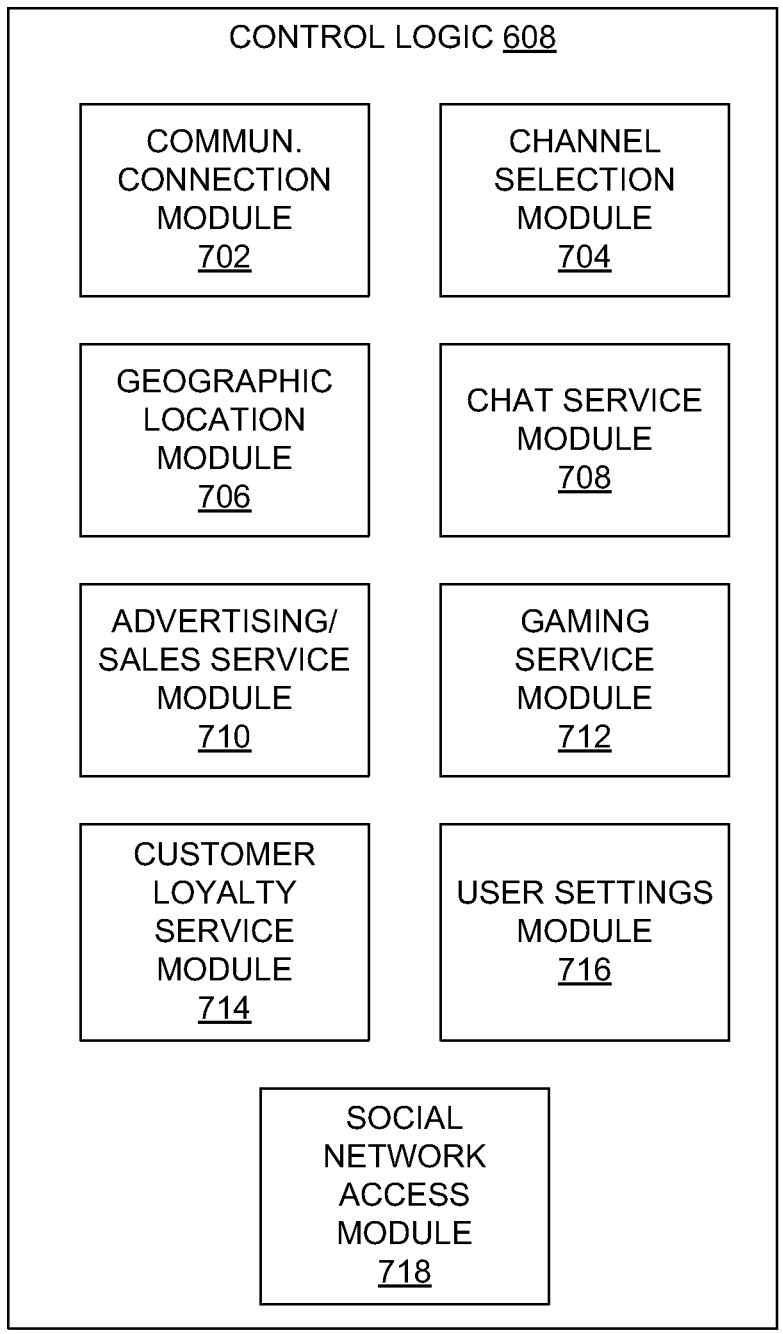
FIG. 7 is a block diagram illustrating example modules implementable as control logic for the example mobile communication device of FIG. 6.

FIG. 7 is a block diagram of example modules incorporated as part of the control logic 608 of the mobile communications device 600 of FIG. 6. Each of the modules shown in FIG. 7 may include hardware, software, or some combination thereof. The example modules may include a communication connection module 702, a channel selection module 704, a geographic location module 706, a chat service module 708, an advertising/sales service module 710, a gaming service module 712, a customer loyalty service module 714, a user settings module 716, and a social network access module 718. Other modules not explicitly depicted in FIG. 7 may also being included in the control logic 608. In one example, one or more of the modules 702-714 may be included or represented in an application, or "app," that may be loaded into, and executed by, the control logic 608 to provide the various functions described in greater detail provided by the mobile communication device 600.

In one example, the communication connection module 702 facilitates the creation of a communication connection between the mobile communication device 600 and the access device 106 to allow the reception of the one or more wireless digital audio streams 124, as well as the transmission and reception of the additional content 126. The communication connection module 702 may also assist in creating a secure connection between the mobile communication device 600 and the access device 106 for various services described more fully below. In one example, the communication connection module 702 also facilitates creating a communication connection between the mobile communication device 600 and the communication node 112 of FIG. 1 and other nodes by way of an alternative communication network, such as a cellular telephone network.

The channel selection module 704, in one example, presents identities of a set of audio channels to the user via the user interface 604 as carried in the one or more wireless digital audio streams 124, receives a user selection of one of the channels, and presents the selected channel to the user, such as by way of an audio speaker or other audio output interface. In an example, the channel selection module 704 may present the identity of an audio channel associated with an identity of its corresponding audio/video output device 102 so that the user may discern which audio channel to select for the video content he is currently viewing.

In one example, the geographic location module 706, by utilizing the geographic location circuitry 606, may determine the current location of the mobile communication device 600 to decide which of multiple access devices 106 currently available are providing acceptable communication signals or signal strengths to the mobile communication device 600, and thus are the access devices 106 most likely to provide audio content of interest to the user of the mobile communication device 600.

In another example, the current location of the mobile communication device 600 may be used to recommend other locations or venues that possess at least one access device 106 for the provision of the services described herein, especially in cases in which no access devices 106 are immediately available at the current location. This functionality is described in greater detail below.

In other situations, technologies other than the geographical location circuitry 606 may be utilized to determine with greater specificity a location of the mobile communication device 600. In just one example, the geographic location module 706 may be configured to decipher quick response (QR) codes placed at various locations in a venue 101 to determine the location of the mobile communication device 600 within the venue 101. Such information may then be made available to the communication node 112 to refine or otherwise direct the services provided to the mobile communication device 600, such as the delivery of food to a specific table equipped with the QR code. Other technologies, such as radio-frequency identification (RFID) technology, may be used to similar effect.

Generally, the chat service module 708, the advertising/sales service module 710, the gaming service module 712, and the customer loyalty service module 714 may facilitate communication in the form of the additional content 126 between the mobile communication device 600 and the access device 106 (and possibly the communication node 112) to provide the user of the mobile communication device 600 access to each of these services. Other examples of the mobile communication device 600, in conjunction with the access device 106, may provide to the user other services of interest that are not explicitly described herein.

The chat service module 708, discussed more fully below, may facilitate communications between the user of the mobile communication device 600 and the users of other connected mobile communication devices 600 via chat rooms. In some examples, such communications may be carried on between mobile communication devices 600 communicatively coupled to the same access device 106, or to different access devices 106, whether located at the same venue or different venues.

The advertising/sales service module 710 may receive advertising from the access device 106 and present the received advertising to the user of the mobile communication device 600. In some examples, the advertising may be sourced by the venue 101, an advertiser associated with the audio channel selected by the user for reception, or another entity, such as a regional or national product or service provider. The advertising/sales service module 710 may also facilitate point-of-sale transactions and related processing and information transfer between the access device 106 and the mobile communication device 600. For example, the user may order food items, merchandise, or the like offered by the venue 101, and pay for the ordered items by way of a credit card or other account. Prior to such communications, the advertising/sales module 710 may invoke the communication connection module 702 to create a secure connection between the access device 106 and the mobile communication device 600 to protect the transmitted information associated with the transaction.

Similarly, the gaming service module 712 may facilitate the transfer of information relating to gaming and/or wagering between the mobile communication device 600 and the access device 106. For example, if the venue 101 is a gambling casino, the mobile communication device 600 may present offers regarding available wagers to be made on a particular outcome of an upcoming sporting event. In response, the user of the mobile communication device 600 may place a wager on a particular outcome of the event via the device 600 and transmit the wager via a secure connection with the access device 106. The results of the wager may then be presented to the user via the mobile communication device 600. In other examples, instead of a wager, the user may provide an answer to a trivia question posed by the venue 101, such as a sports bar.

To facilitate a customer loyalty program associated with the venue 101 or another entity, the customer loyalty service module 714 may receive information regarding available registration for a loyalty program (such as a program associated with the venue at which the user is located, for example), the current number of "points" or other indication regarding the standing of the user within the loyalty program, information as to how the user may earn more points, information as to what the user may receive for redeeming a quantity of the earned points, and other related information, and present that information to the user. The user, in response, may register for the loyalty program, earn more points, redeem previously earned points, or perform some other action regarding the customer loyalty program by providing response information via the mobile communication device 600 to the access device 106.

The user settings module 716 may allow a user to alter or change various settings or parameters that control the operation of the mobile communication device 600 or the access device 106. Examples of such settings include, but are not limited to, details regarding how the mobile communication device 600 presents information to the user, information associated with the user (such as a chat "handle" or identifier for the user), selection of a LAN for communication with an access device 106, user visibility/anonymity settings, and user preferences regarding reception of personalized offers or loyalty program subscriptions.

The social network access module 718 may allow a user to access social functions within the system 100, such as invitations, friend identification and location, business social marketing features, and interconnection with the features of other social networks, such as Facebook®. In one example, a user may broadcast the location and current status of the user to friends or the entire system 100 upon the user initiating an application allowing access to the audio distribution system 100, or upon initiating a connection with an access device 106. In another implementation, the user may initiate the broadcast operation via a selection "button" or other data entry mechanism provided by an application executing on the mobile communication device 600. In some examples, these and other social network functions are provided within the system 100 via API (Application Programming Interface) support from other social networks, such as Facebook®.

Figure 8:
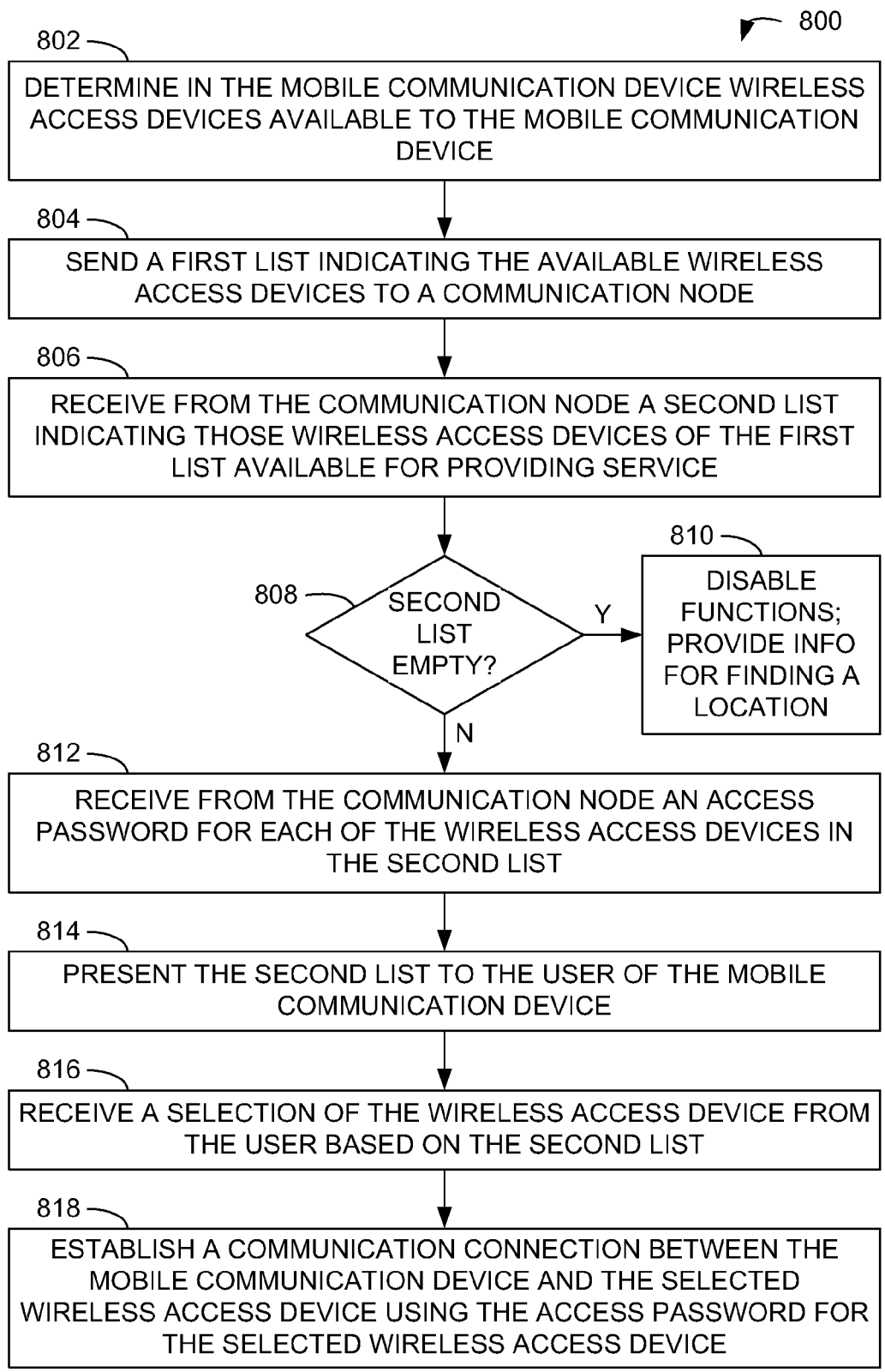
FIG. 8 is a flow diagram illustrating an example method of operating the example mobile communication device of FIG. 6 to establish a communication connection between the mobile communication device and a wireless access device.

FIG. 8 is a flow diagram of an example method 800 for establishing a communication connection between the mobile communication device 600 and an access device 106. In the method 800, the mobile communication device 600 determines any wireless access nodes or devices available to the mobile communication device 600 (operation 802), and transmits a first list indicating the available wireless access devices to a communication node (operation 804), such as the communication node 112 of FIG. 1. This communication may occur, for example, over a cellular network connection with the Internet or another WAN coupled with the communication node. This first list may be generated via a polling of information indicating signal strengths of nearby wireless access devices from the mobile communication device 600, such as by way of an API provided by the operating system of the device 600. The mobile communication device 600 may also transmit an indication of the geographic location of the device 600 to the communication node 112, as supplied by the geographic location module 706. In response, the mobile communication device 600 may receive a second list indicating those wireless access devices of the first list that are available for providing the various services described herein (operation 806). If the second list is empty (in other words, no wireless access devices are listed) (operation 808), at least some functions related to the services to be provided may be disabled (operation 810). Also, information may be presented to the user regarding the location of nearby out-of-range wireless access devices that may provide such services. Otherwise, if the second list is not empty, the mobile communication device 600 may receive an access password for each of the wireless access devices of the second list (operation 812). The mobile communication device 600 may then present the second list to the user (operation 814). In response, the mobile communication device 600 may receive from the user a selection of the wireless access device to be used from the second list (operation 816). Based on the selection, the mobile communication device 600 may then establish a communication connection between the mobile communication device 600 and the selected access device 106 using the access password for the selected wireless access device 106 (operation 818). In one example, the user is prevented from seeing the access passwords, thus keeping the identity of the passwords hidden. In another implementation, the mobile communication device 600 may automatically select one of the available access devices 106 on behalf of the user. For example, the mobile communication device 600 may select, and establish a connection with, an access device 106 based on the detected signal strength of the access device 106.

Figure 9:
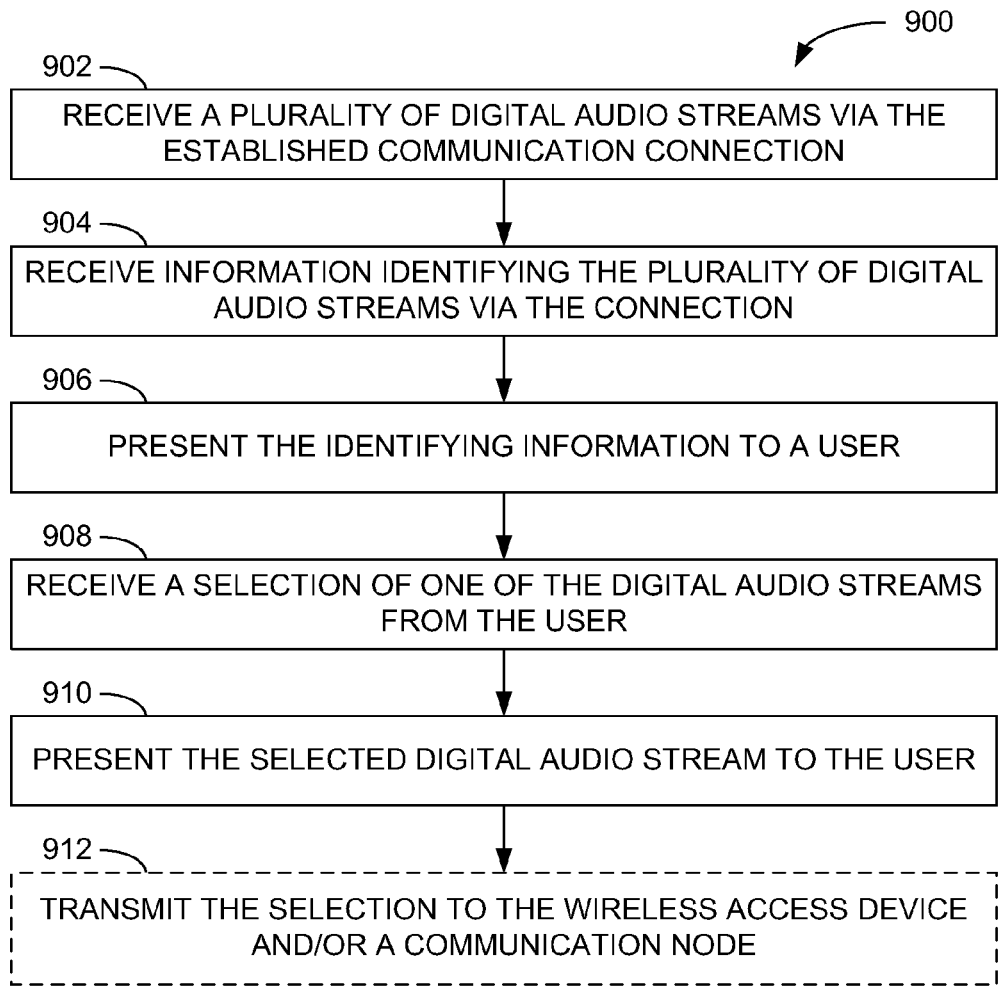
FIG. 9 is a flow diagram illustrating an example method of operating the example mobile communication device of FIG. 6 to provide a selected digital audio stream to a user.

FIG. 9 is a flow diagram of an example method 900 of receiving audio data into the mobile communication device 600 after a communication connection with the access device 106 has been established. In the method 900, the mobile communication device 600 receives a plurality of digital audio streams via the established communication connection (operation 902). Each of the streams may represent the audio content from a particular audio/video output device 102 in one implementation. In one example, the plurality of digital audio streams may be combined into fewer signal data streams, wherein the digital audio streams are multiplexed in some fashion. The mobile communication device 600 also receives information identifying the plurality of digital audio streams via the communication connection (operation 904). The information may include, in one implementation, an identification of the audio/video output device 102 that is sourcing the audio of each digital audio stream. After the mobile communication device 600 presents the identifying information to the user (operation 906), the mobile communication device 600 receives a selection of one of the digital audio streams from the user (operation 908). In response to the user selection, the mobile communication device 600 presents the selected digital audio stream to the user for listening (operation 910). In some implementations, the mobile communication device 600 may also transmit the user selection to the wireless access device 106 and/or the communication node 112 (operation 912), as the identification may allow presentation of additional content 126 (such as product or service advertising) that is related to the audio/video content being consumed by the user.

Figure 10:
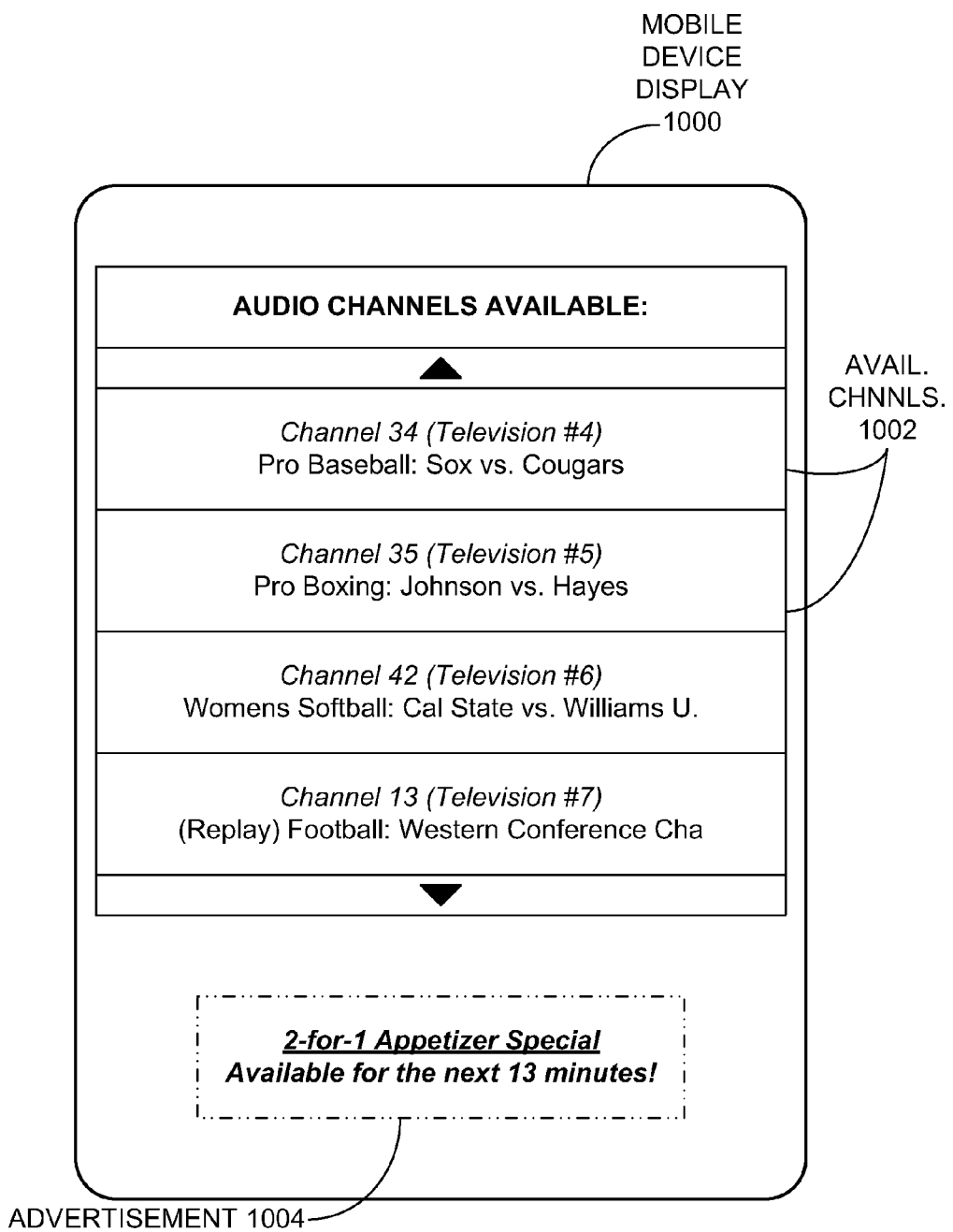
FIG. 10 is a graphical representation of example information provided on a display of an example mobile communication device.

FIG. 10 is a graphical representation of an example mobile device display 1000 of the mobile communication device 600 presenting the identity of several digital audio data streams available for reception. More specifically, the display 1000 presents the identity of several different audio/video channels along with an identity of the particular audio/video output device 102 associated with the digital audio stream and a short description of the audio/video content. In one example, presuming the display 1000 is a touchscreen, the user need only touch one of the available audio channels, and the mobile communication device 600 begins presenting the audio for the selected channel in response. Also shown in the display 1000 may be an advertisement presented by the establishment or venue 101 in which the mobile communication device 600 is located. Given the potential real-time nature of the information being presented to the user, the advertisement may incorporate a time-critical element, such as an expiration time.

In one example, upon the user selecting one of the available audio channels, a second display associated with the selected audio channel may be presented to the user. This display may present information, such as the broadcast channel and the particular program or event involved, which is specifically associated with the selected audio channel. In some examples, the channel-specific display may include advertising, such as advertising corresponding to the broadcast channel or the venue.

Figure 11:
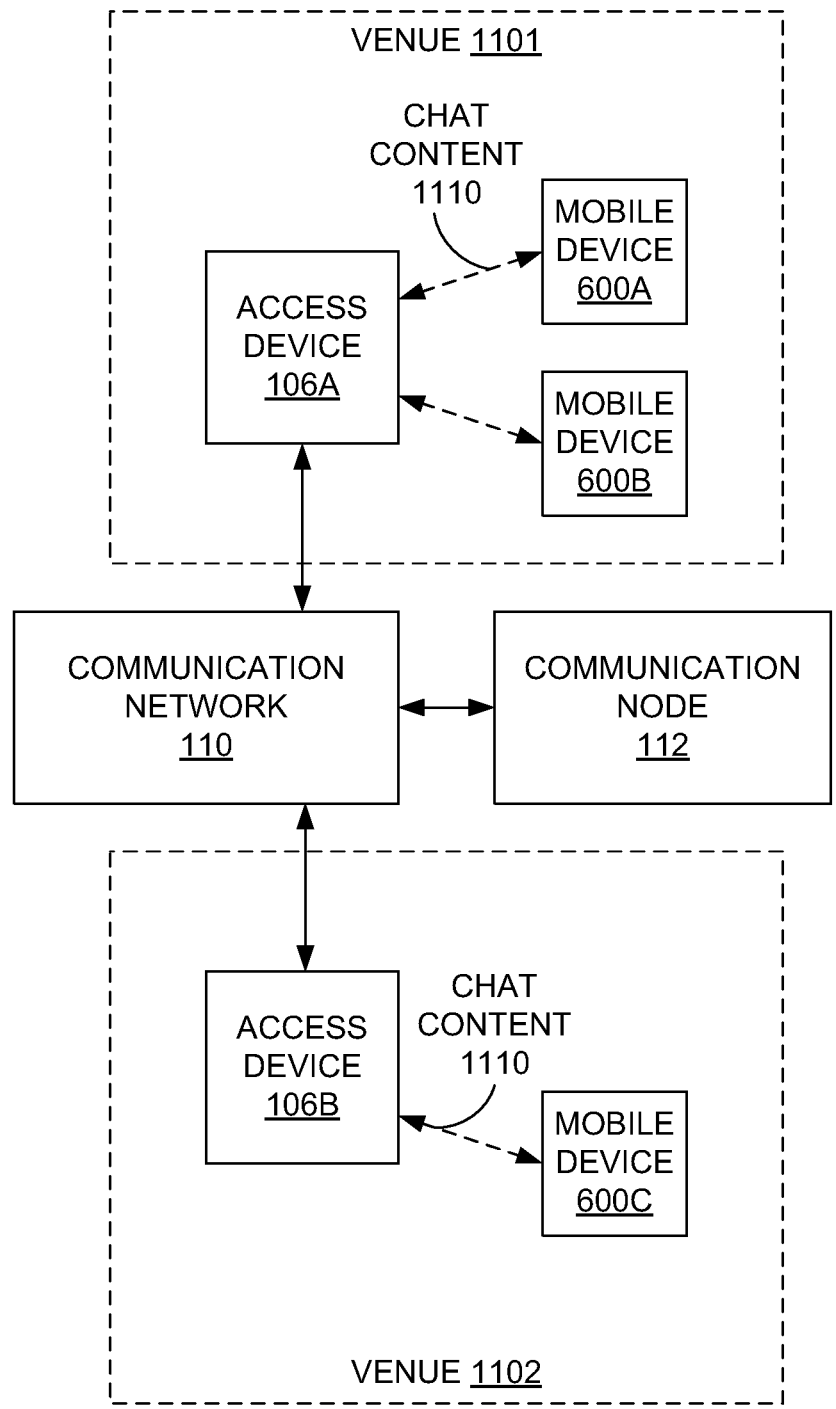
FIG. 11 is a block diagram illustrating at least one example audio distribution system facilitating an example chat communication between at least two mobile communication devices.

FIG. 11 is a block diagram of a system in which communications may be established between two or more mobile communication devices 600 via one or more chat rooms. In an example, an access device 106A located at a first venue 1101 may be employed to transmit chat content between a first mobile communication device 600A and a second mobile communication device 600B located at the first venue 1101. In another example, one or both of the mobile devices 600A, 600B may engage in communications with a third mobile communication device 600C located at a second venue 1102 via the first access device 106A of the first venue 1101 and a second access device 106B located at the second venue 1102. In this second example, the communication network 110 may take part in transferring the chat content 1110 between the various mobile communication devices 600. In one implementation, the communication node 112 provides assistance in one or more aspects of the chat rooms, such as the identification of the chat rooms that are currently available for users of the system 100.

Figure 12:
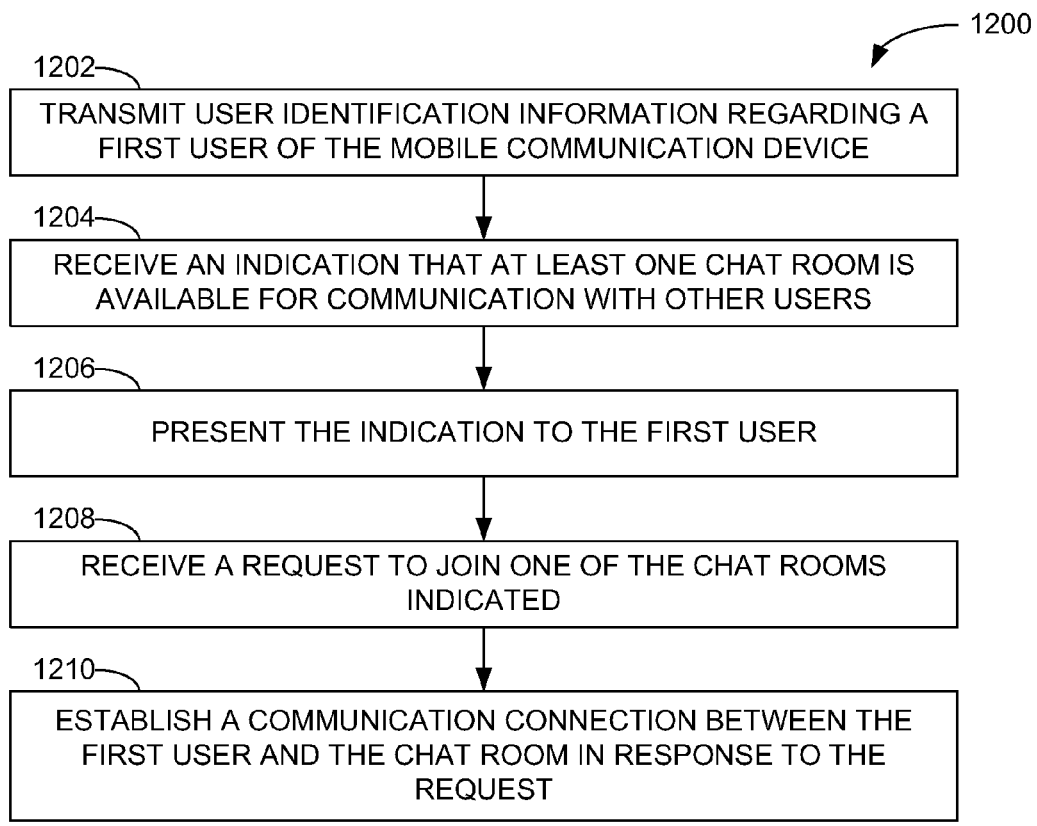
FIG. 12 is a flow diagram illustrating an example method of facilitating the connection of a mobile communication device with a chat room.

FIG. 12 is a flow diagram of an example method 1200 of establishing communications between two or more mobile communication devices 600 via a chat room. In the method 1200, the mobile communication device 600 transmits user identification regarding a user of the mobile communication device 600 (operation 1202). In one example, this information may be transmitted to the access device 106 before or after a communication connection has been established with the access device 106. The mobile communication device 600 then receives an indication that at least one chat room is available for communication with other users (operation 1204). The mobile communication device 600 may then present the indication to the user (operation 1206). The mobile communication device 600 may then receive a request from the user to join one of the chat rooms indicated (operation 1208). In response to the request, the mobile communication device 600 may then establish a connection between the first user and the chat room to engage in communications with other users that have joined the same room (operation 1210). In some examples, a communication node 112 may initiate the process by transmitting to the mobile communication device 600 an invitation to join a chat room. More generally, the communication node 112 may also transmit an invitation to a user to appear at a particular venue 101 or location.

Figure 13:
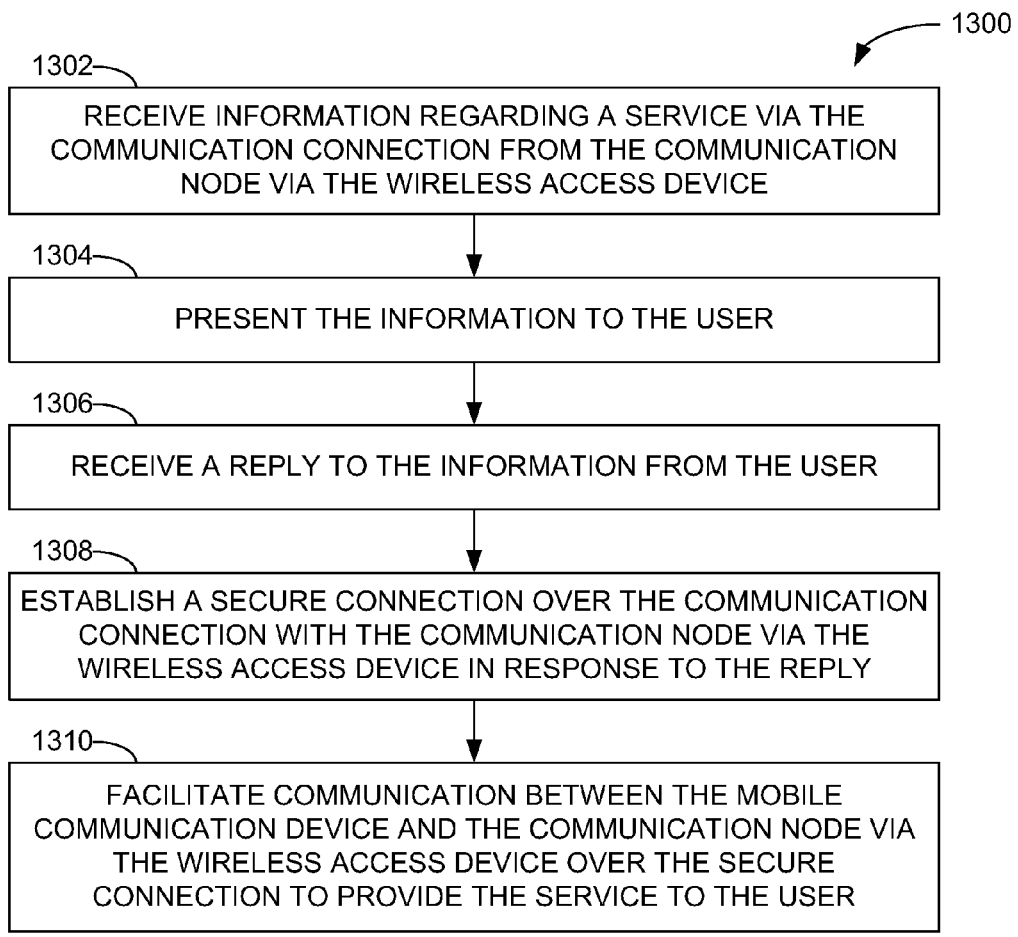
FIG. 13 is a flow diagram illustrating an example method of providing an example service to a mobile communication via an example access device.

FIG. 13 is a flow diagram illustrating an example method 1300 of a mobile communication device 600 providing to a user one of a number of services (for example, sales, gaming, social networking, and/or customer loyalty program services, as described above) supplied by the audio distribution system 100. In the method 1300, the mobile communication device 600 may receive information regarding a service from the communication node 112 via a previously established communication connection with an access device 106 (operation 1302). The mobile communication device 600 may then present the information to the user (operation 1304). Such information may include, for example, possible wagers for the user to place, products or services for sale, and so on. A mobile communication device 600 may then receive a reply to the information from the user (operation 1306). Examples of such a reply may be, for example, a wager or a purchase request. In response to the reply, the mobile communication device 600 may then establish a secure connection, such as a connection for transmitting encrypted data, using the established connection between the mobile communication device 600 and the communication node 112 via the access device 106 (operation 1308). The mobile communication device 600 may then facilitate communication between the mobile communication device 600 and the communication node 112 via the access device 106 over the secure connection to provide the specific service to the user (operation 1310).

The communication node 112 of FIG. 1, in one example, may facilitate access by the mobile communication devices 108 to the various services described above, as well as to provide configuration and membership functionality related to the audio distribution systems discussed above. In some implementations, the communication node 112 may be referred to as a server providing these various functions. Thus, the communication node 112 may include at least one computer processor executing instructions associated with a number of software modules to perform the various functions discussed below. In some examples, a module may include software, electronic hardware, or some combination thereof.

Figure 14:
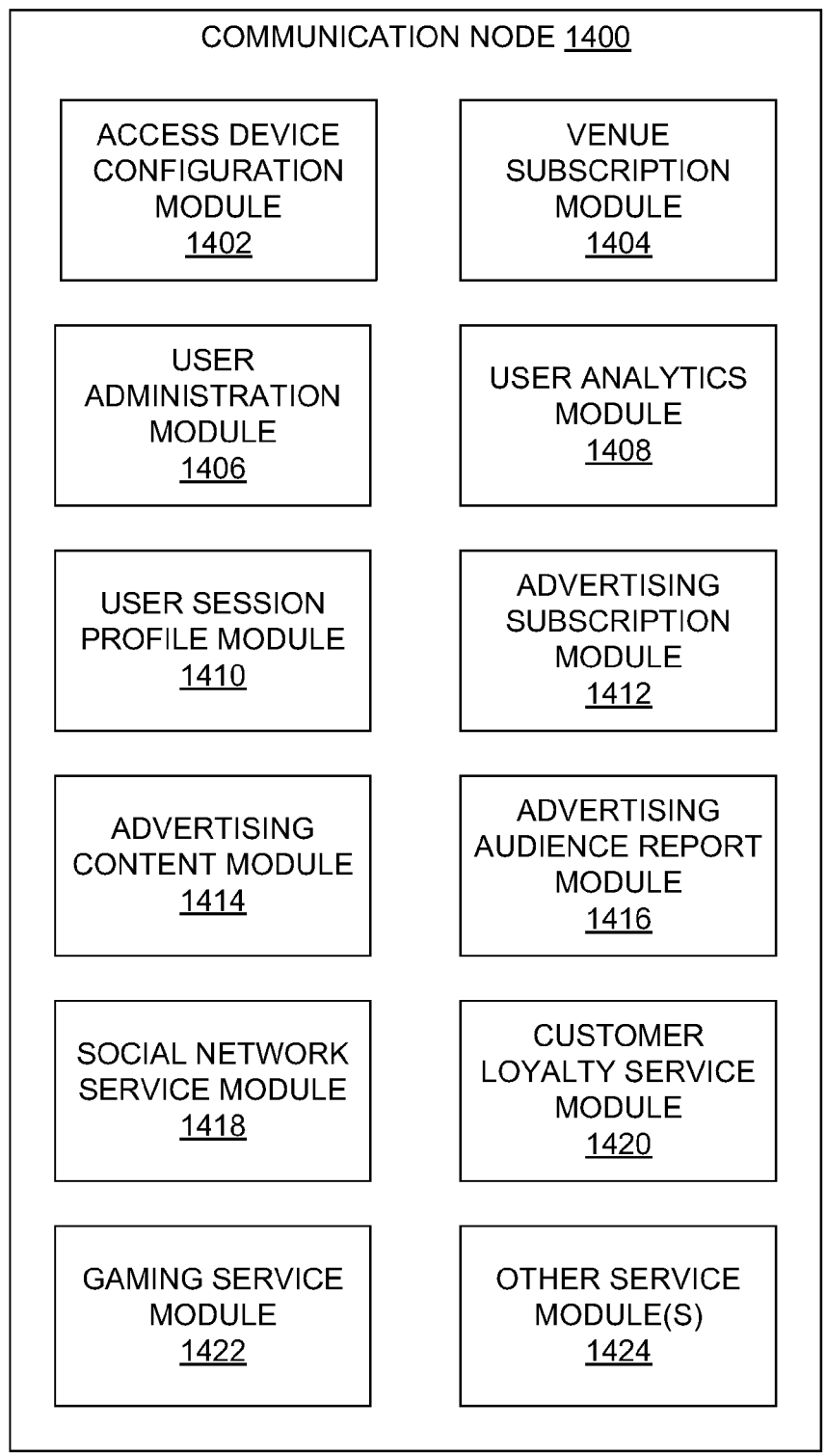
FIG. 14 is a block diagram illustrating example modules of an example communication node portrayed in FIG. 1.

FIG. 14 is a block diagram of example modules included in a communication node 1400, which may be representative of the communication node 112 of FIG. 1. The communication node 1400 includes an access device configuration module 1402, a venue subscription module 1404, a user administration module 1406, a user analytics module 1408, a user session profile module 1410, an advertising subscription module 1412, an advertising content module 1414, an advertising audience report module 1416, a social network service module 1418, a customer loyalty service module 1420, a gaming service module 1422, and one or more other service modules 1424. The communication node 1400 or server may include additional modules, or include fewer modules, than that shown in FIG. 14 in other implementations.

The access device configuration module 1402 may cause the communication node 1400 to communicate with an access device 106 by way of the communication network 110 to configure the access device 106, including, for example, network and communication parameters to be used by the access device 106, and information to be stored on the access device 106 for transfer to one or more mobile communication devices 108. In one example, the access device configuration module 1402 may also provide configuration information for one or more converter devices 104 in communication with the access device 106 via the access device 106. In some implementations, the access device configuration module 1402 may also control configurations of one or more of the mobile communication devices 108 by way of information transmitted via the access device 106.

The venue subscription module 1404 may perform operations associated with initiating and maintaining a subscription to one or more services available via the communication node 1400 by an entity associated with the venue 101 hosting the access device 106. In one example, such an entity may subscribe over some period of time, such as a year or a month, to provide any or all of a number of services, including, but not limited to, an audio distribution service, a chat service, a gaming service, a customer loyalty service, and a point-of-sale service. Such a subscription, in one example, may allow the entity to provide one or more of the services to patrons or customers of the entity free of charge. The entity may also subscribe to an advertising service, as is described in greater detail below.

The user administration module 1406 may facilitate the registration of users of mobile communication devices 108 with the system 100. Such registration may, for example, allow the communication node 112 to store identification data (such as a chat handle), credit card information, personal preferences, "friend" identifications of other users, and other data associated with the user. The maintenance of such information at the communication node 112 may allow the communication node 112 to recognize the user quickly and allow the user to employ the information regardless of the particular access device 106 or venue 101 currently hosting the user. In some cases, the user administration module 1406 may also control access to the system 100 on a user-by-user basis, depending on previous activities of the user, the current number of users coupled to the system 100, and/or other factors.

The user analytics module 1408 may allow the communication node 112 to track each connection or session to the system 100 by a user of a particular mobile communication device 108 via an access device 106, including, but not limited to, the types of services utilized by the user, and the particular audio content requested by the user. Such information may be beneficial for directing particular types of advertising to the user, offering specific services to the user, and the like. In some examples, the communication node 112 may also employ the information to determine how the user employs the access device 106 and other portions of the system 100. In one example, by aggregating this information for each of the users, the communication node 112 may determine proper configurations for access devices 106 to make the system 100 more efficient, determine future equipment needs for the system 100, and so on. Thus, the metrics and related information provided via the user analytics module 1408 may be advantageous for both administrators of the system 100 and paid subscribers to the system 100.

The user session profile module 1410 may maintain a database of session profiles for each user (such as end users, entities associated with particular venues 101, system administrators, and the like) so that the communication node 112 may control user access to the system 100. Each of the session profiles may include, for example, a domain name, user name or log-in, password, and the like. A profile may also allow a user to access the system 100 by way of an access device 106, over the Internet, through a cellular phone network, or via some other communication path. In some examples, a session profile may also include information specific to the mobile communication device 108 employed by the user, such as the type and model of the device 108, the functional and performance capabilities of the device 108, and the like.

The advertising subscription module 1412 may facilitate the initiation and maintenance of advertising subscriptions by various entities, such as those associated with specific venues 101. In one example, an advertising subscription may allow an entity associated with a venue 101 to provide advertising to one or more mobile communication devices 108 coupled with an access device 106 located at the venue 101, as discussed above. Other entities, such as national or regional providers of goods or services that are not associated with a particular venue 101, may also subscribe to the advertising services provided by the system 100.

The advertising content module 1414 may provide means by which advertising subscribers may upload advertising content to the communication node 112 for subsequent transmission to mobile communication devices 108 by way of the system 100. In some examples, subscriber entities associated with a particular venue 101 may have their advertising delivered to mobile communication devices 108 communicatively coupled with an access device 106 located at the venue 101. Advertising supplied by national or regional subscribers may be transmitted to mobile communication devices 108 located at multiple venues 101.

In some implementations, the advertising supplied to a mobile communication device 108 may initiate other actions within the mobile communication device 108. For example, in response to a user touching or otherwise activating a displayed advertisement, the mobile communication device 108 may open a web browser and direct the browser to an associated web page, such as a web page for the subscriber providing the advertisement. In another example, the mobile communication device 108 may initiate some activity, such as a game, a registration process in a loyalty program, a purchase, or a wager.

The advertising audience report module 1416 may generate and provide to advertising subscribers reports regarding users of the mobile communication devices 108 that receive, or are capable of receiving, the advertising provided by the advertising subscriber. Such information may include, for example, demographic information, personal interest information, survey response information, point-of-sale transaction information, a number of advertisement impressions, a number of advertisements with user interaction, and the like, that the advertising subscriber may find useful in directing current and future advertising efforts.

The social network service module 1418, the customer loyalty service module 1420, and the gaming service module 1422 facilitate the provision of the corresponding services discussed above with respect to the social network access module 718, the gaming service module 712, and the customer loyalty service module 714 of the mobile communication device 600, respectively. Each of these services is described in greater detail above. Each of these modules 1418, 1420, 1422 may facilitate the services for each user at each venue associated with the system 100. Further, each service may be organized by venue, across the entire system 100, by corporate entity, by specific product brand, and/or by any other type of organizational structure applicable to social networks, gaming services, and customer loyalty programs.

One or more other service-specific modules 1424 may also be incorporated in the communication node 112 to facilitate one or more services, such as, for example, point-of-sale or mobile commerce (mCommerce) transactions. In one implementation, the communication node 112 provides the service-related information (offer of products, for example) to a user of a mobile communication device 108 by way of the communication network 110 and the access device 106 that is communicatively coupled with the mobile communication device 108. The communication node 112 may also receive any responses to the service-related information (for example, product purchases) from the user via the same path, and process those responses in order to provide the desired services. In other examples, point-of-sale transaction and other services may be provided to subscribers other than those entities associated with a particular venue 101.

While much of the above discussion focuses on certain public venues, such as restaurants, bars, and sports books, as likely locations for implementation of the systems and methods described herein, other venues, both public and private, such as airport terminals or gate areas, corporate reception lobbies, doctor's office waiting areas, and so on, may also benefit from application of the various concepts described herein.

Modules, Components, and Logic

Certain embodiments, such as the converter devices 104, 200, the access devices 106, 400, the mobile communication devices 108, 600, and the communication nodes 112, 1400 discussed above, are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations thereof. Example embodiments may be implemented using a computer program product (e.g., a computer program tangibly embodied in an information carrier in a machine-readable medium) for execution by, or to control the operation of, data processing apparatus (e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communications network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a field programmable gate array (FPGA) or an application-specific integrated circuit (ASIC)).

The computing system can include clients and servers. A client and server are generally remote from each other and typically interact through a communication network. The relationship of client and server arises by virtue of computer programs running on their respective computers and having a client-server relationship to each other. In embodiments deploying a programmable computing system, it will be appreciated that both hardware and software architectures may be considered. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set forth hardware (e.g., machine) and software architectures that may be deployed in various example embodiments.

Example Machine Architecture and Machine-Readable Medium

Figure 15:
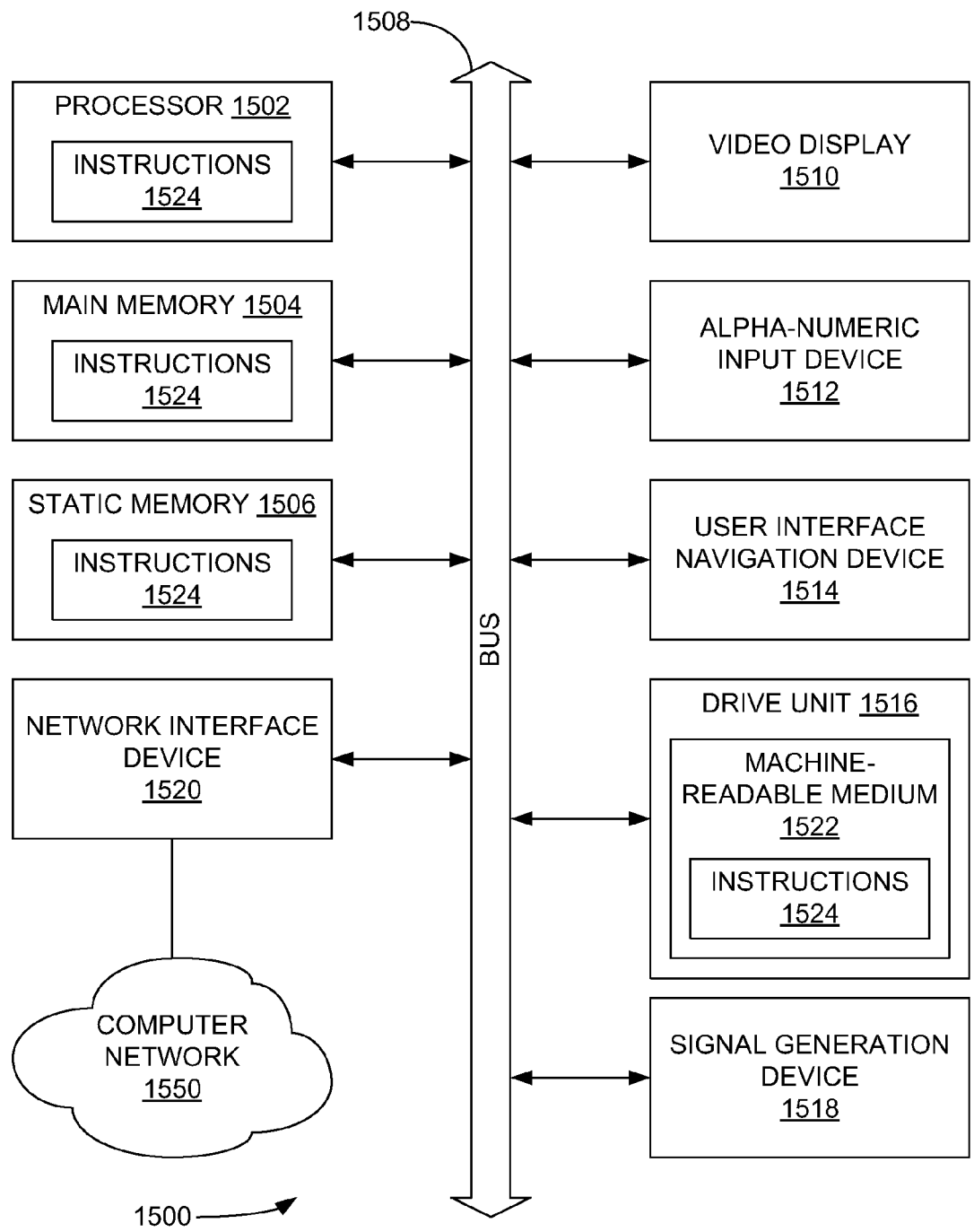
FIG. 15 is a diagrammatic representation of a machine in the example form of a computer system within which a set of instructions for causing the machine to perform any one or more of the methodologies discussed herein may be executed.

FIG. 15 is a block diagram of a machine in the example form of a computer system 1500 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU), or both), a main memory 1504, and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker), and a network interface device 1520.

Machine-Readable Medium

The disk drive unit 1516 includes a machine-readable medium 1522 on which is stored one or more sets of data structures and instructions 1524 (e.g., software) 1524 embodying or utilized by any one or more of the methodologies or functions described herein. The instructions 1524 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is shown in an example embodiment to be a single medium, the term "machine-readable medium" may include a single medium or multiple media (e.g., a centralized or distributed database, and/or associated caches and servers) that store the one or more instructions 1524 or data structures. The term "non-transitory machine-readable medium" shall also be taken to include any tangible medium that is capable of storing, encoding, or carrying instructions for execution by the machine and that cause the machine to perform any one or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 1524 may further be transmitted or received over a computer network 1550 using a transmission medium. The instructions 1524 may be transmitted using the network interface device 1520 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

CONCLUSION

Thus, methods and systems to distribute one or more streams of audio data, as well as provide advertising and/or one or more customer-oriented services, have been described. Although the present subject matter has been described with reference to specific example embodiments, it will be evident that various modifications and changes may be made to these embodiments without departing from the broader scope of the subject matter. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive "or", such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels and are not intended to impose numerical requirements on their objects.

The Abstract of the Disclosure is provided to comply with 37 C.F.R. §1.72(b), requiring an abstract that will allow the reader to quickly ascertain the nature of the technical disclosure. The Abstract is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
   an access device located at a commercial venue, the access device being communicatively coupled via a local area network with a mobile communication device located at the commercial venue, the access device configured to receive each of a plurality of digital audio streams from an audio relay device coupled with an audio output of a corresponding video display device displaying video content to a user of the mobile communication device, the access device configured to transmit wirelessly at least one of the received digital audio streams via the local area network to the mobile communication device, the video display device being different than the mobile communication device; and
   a communication node communicatively coupled to the access device via a wide area network, the communication node comprising a venue subscription module configured to maintain a subscription for a commercial entity associated with the commercial venue to provide a commercial service related to the commercial venue to the user of the mobile communication device via the access device;
   the access device configured to exchange information between the communication node via the wide area network and the mobile communication device via the local area network, the information relating to the commercial service; and
   the communication node configured to receive from the access device a selection by the user of the mobile communication device of one of the plurality of digital audio streams that is received from the audio relay device for presentation to the user, and to provide to the mobile communication device content associated with the commercial service offered by one or more commercial entities with subscriptions maintained by the communication node based on the selection by the user.

2. The system of claim 1, the commercial service including the transmitting wirelessly of the received digital audio streams to the mobile communication device.

3. The system of claim 1, the communication node comprising a user administration module to register the user of the mobile communication device with the communication node, the registering of the user comprising storing information identifying the user.

4. The system of claim 3, the user administration module to recognize the user of the mobile communication device while the mobile communication device is coupled to a second access device located at a second commercial venue and communicatively coupled with the communication node based on the information identifying the user.

5. The system of claim 1, the communication node comprising a user analytics module to monitor connections of the mobile communication device to the access device.

6. The system of claim 5, the user analytics module to determine a type of commercial service provided to the user of the mobile communication device based on the monitoring of the connections of the mobile communication device to the access device.

7. The system of claim 6, the user analytics module to cause advertising to be directed to the mobile communication device based on the type of commercial service provided to the user.

8. The system of claim 5, the user analytics module to configure the access device based on the monitoring of the connections of the mobile communication device to the access device.

9. The system of claim 1, the communication node comprising an advertising subscription module to maintain an advertising subscription of an advertiser with the communication node, the advertising subscription allowing the advertiser to provide advertising to the mobile communication device via the communication node and the access device.

10. The system of claim 9, the advertiser being the commercial entity associated with the commercial venue.

11. The system of claim 9, the advertiser being a regional or national commercial entity not associated with the commercial venue.

12. The system of claim 1, the communication node comprising an advertising content module to receive advertising content from an advertising subscriber of the communication node, to store the advertising content, and to transmit the advertising content to the mobile communication device via the access device.

13. The system of claim 12, the advertising subscriber comprising the commercial entity associated with the commercial venue.

14. The system of claim 12, the advertising content comprising an instruction to open a web page representing the advertising subscriber in response to the user of the mobile communication device activating the advertising content on the mobile communication device.

15. The system of claim 1, the communication node comprising an advertising audience report module to generate a report including information describing the user of the mobile communication device and to provide the report to an advertiser subscribed to the communication node.

16. The system of claim 15, the report including information comprising at least one of demographic information, personal interest information, survey response information, and point-of-sale transaction information.

17. The system of claim 1, the communication node comprising a point-of-sale module to offer a product available at the commercial venue to the user of the mobile communication device via the access device.

18. The system of claim 1, the communication node comprising a mobile commerce module to offer a product to the user of the mobile communication device via the access device.

19. The system of claim 1, the communication node comprising a customer loyalty service module to provide the user of the mobile communication device access to a customer loyalty program maintained by the commercial entity associated with the commercial venue.

20. The system of claim 1, the access device to provide a point-of-sale transaction at the commercial venue for the user via the mobile communication device.

21. The system of claim 1, the access device to provide access to the user via the mobile communication device of a customer loyalty program for the commercial entity associated with the commercial venue.

22. A method comprising:
  receiving, at an access device located at a commercial venue, each of a plurality of digital audio streams from an audio relay device coupled with an audio output of a corresponding video display device displaying video content to a user of a mobile communication device located at the commercial venue, the video display device being different than the mobile communication device;
  transmitting wirelessly, from the access device, at least one of the received digital audio streams to the mobile communication device via a local area network;
  maintaining, at a communication node coupled with the access device via a wide area network, a subscription for a commercial entity associated with the commercial venue to provide a commercial service related to the commercial venue to the user of the mobile communication device via the access device;
  exchanging, at the access device, information between the mobile communication device via the local area network and the communication node via the wide area network, the information relating to the commercial service;
  receiving, at the communication node from the access device, a selection by the user of the mobile communication device of one of the plurality of digital audio streams that is received from the audio relay device for presentation to the user; and
  providing, to the mobile communication device, content associated with the commercial service offered by one or more commercial entities with subscriptions maintained by the communication node based on the selection by the user.

23. A tangible computer-readable storage medium comprising instructions that, when executed by at least one hardware processor of a system, cause the system to perform operations comprising:
  receiving, at an access device located at a commercial venue, each of a plurality of digital audio streams from an audio relay device coupled with an audio output of a corresponding video display device displaying video content to a user of a mobile communication device located at the commercial venue, the video display device being different than the mobile communication device;
  transmitting wirelessly, from the access device, at least one of the received digital audio streams to the mobile communication device via a local area network;
  maintaining, at a communication node coupled with the access device via a wide area network, a subscription for a commercial entity associated with the commercial venue to provide a commercial service related to the commercial venue to the user of the mobile communication device via the access device;
  exchanging, at the access device, information between the mobile communication device via the local area network and the communication node via the wide area network, the information relating to the commercial service;
  receiving, at the communication node from the access device, a selection by the user of the mobile communication device of one of the plurality of digital audio streams that is received from the audio relay device for presentation to the user; and
  providing, to the mobile communication device, content associated with the commercial service offered by one or more commercial entities with subscriptions maintained by the communication node based on the selection by the user.

* * * * *